United States Patent
Shiba et al.

(12)

(10) Patent No.: US 6,777,096 B2
(45) Date of Patent: Aug. 17, 2004

(54) AQUEOUS POLYOLEFIN RESIN DISPERSION

(75) Inventors: Kenjin Shiba, Kyoto (JP); Shoji Okamoto, Kyoto (JP); Hayami Onishi, Kyoto (JP); Hiroshi Kajimaru, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 10/343,334

(22) PCT Filed: Jan. 11, 2002

(86) PCT No.: PCT/JP02/00162

§ 371 (c)(1),
(2), (4) Date: Jan. 28, 2003

(87) PCT Pub. No.: WO02/055598

PCT Pub. Date: Jul. 18, 2002

(65) Prior Publication Data

US 2003/0187128 A1 Oct. 2, 2003

(30) Foreign Application Priority Data

| Feb. 13, 2001 | (JP) | ................................ 2001-035333 |
| Mar. 21, 2001 | (JP) | ................................ 2001-080731 |
| Aug. 9, 2001 | (JP) | ................................ 2001-242276 |
| Sep. 27, 2001 | (JP) | ................................ 2001-296881 |
| Sep. 28, 2001 | (JP) | ................................ 2001-303392 |
| Jan. 15, 2002 | (JP) | ................................ 2001-006390 |

(51) Int. Cl.[7] .................. B32B 15/08; B32B 27/00
(52) U.S. Cl. .................. 428/463; 428/457; 428/461; 428/476.3; 428/483; 428/500; 428/520; 427/372.1; 427/388.1; 524/442; 524/449; 524/543; 524/555; 524/556; 524/559; 524/560

(58) Field of Search ................. 524/555, 556, 524/559, 560, 543, 442, 492, 272; 428/476.3, 483, 500, 520, 457, 461, 463, 462; 427/372.1, 388.1, 372.2

(56) References Cited

U.S. PATENT DOCUMENTS 3,823,108 A 7/1974 Bissot .................. 524/272

FOREIGN PATENT DOCUMENTS

| EP | 718318 | 6/1993 |
| JP | 62-502692 | 10/1987 |
| JP | 3-80052 | 12/1991 |

*Primary Examiner*—Monique R. Jackson
(74) *Attorney, Agent, or Firm*—Fildes & Outland, P.C.

(57) ABSTRACT

An aqueous dispersion that comprises: (A) a polyolefin terpolymer resin obtained from (a) an unsaturated carboxylic acid or anhydride thereof, (b) an ethylenic hycrocarbon, and (c) a specific compound, the proportion of (a) being 0.01 to 5 wt %, excluding 5 wt %, and the ratio of (b) to (c) being from 55/45 to 99/1 (wt %); (B) a basic compound; and (C) an aqueous medium, that the polyolefin terpolymer resin (A) dispersed in the aqueous medium has a number-average particle diameter of 1 μm or smaller, and that the dispersion contains substantially no nonvolatile water-compatibilizing agent. Also provided are a coated film obtained by applying this aqueous dispersion to a thermoplastic resin and a coated metal material obtained by applying this aqueous dispersion to a metal material.

27 Claims, No Drawings

AQUEOUS POLYOLEFIN RESIN DISPERSION

TECHNICAL FIELD

The present invention relates to an aqueous polyolefin resin dispersion.

BACKGROUND ART

With a recent trend toward the restriction of the use of organic solvents from the viewpoint of environmental protection, resource saving, hazardous material regulations under the Japanese Fire Defense Law and improvement of office environments, various aqueous resin dispersions have been developed. Aqueous resin dispersions containing olefin compounds will be described below.

It is known that an aqueous dispersion of a resin containing an olefin compound in a lower proportion is generally obtained by emulsion polymerization or dispersion polymerization in the presence of an emulsifying agent or a protective colloidal compound. However, a reaction pressure for the polymerization is increased, as the content of the olefin compound in the resin is increased. In consideration of equipment and safety, it is difficult to obtain a stable aqueous dispersion by the aforesaid method. A resin containing the olefin compound in a greater proportion is generally obtained by high-pressure radical polymerization in a high-pressure ethylene plant or the like and, in general, is not provided in the form of an aqueous dispersion.

On the other hand, where the resin containing the olefin compound in a greater proportion is copolymerized with an unsaturated carboxylic acid at a higher copolymerization ratio, the resin can be provided in the form of an aqueous dispersion. For example, aqueous dispersions of ethylene-unsaturated carboxylic acid copolymer resins such as ethylene-acrylic acid copolymer resins and ethylene-methacrylic acid copolymer resins each containing about 20 wt % of an unsaturated carboxylic acid are conventionally known. Particularly, the aqueous dispersion of such resins can easily be prepared by employing an alkaline metal compound or ammonia and, therefore, this method is widely used. Where the content of the unsaturated carboxylic acid in the ethylene-unsaturated carboxylic acid copolymer resin is increased, the water compatibilization of the resin is facilitated, but the amount of carboxyl groups reactive with various compounds is increased. This significantly reduces the blend stability of the aqueous dispersion when an additive, particularly a compound reactive with the carboxyl groups, is added to the aqueous dispersion after the preparation.

Therefore, an attempt is made to reduce the content of the unsaturated carboxylic acid in the ethylene-unsaturated carboxylic acid copolymer resin. However, the water compatibilization of the resin becomes more difficult, as the content of the unsaturated carboxylic acid is reduced. For example, Japanese Unexamined Patent Publications No. 2000-72879 and No. 2000-119398 disclose aqueous dispersions of ethylene-unsaturated carboxylic acid copolymer resins each containing 5 to 30 wt % of an unsaturated carboxylic acid and preparation methods therefor, but virtually provide only those containing the unsaturated carboxylic acid in proportions of not smaller than 15 wt % as examples. Where a polyolefin resin containing an unsaturated carboxylic acid in a smaller proportion, more specifically, an ethylene-unsaturated carboxylic acid copolymer containing the unsaturated carboxylic acid in a proportion of smaller than 10 wt %, particularly smaller than 5 wt %, is to be dispersed in an aqueous medium, the resin is first dissolved in an organic solvent or melted to be made into a liquid form, and then mechanically dispersed in the aqueous medium in the presence of a nonvolatile water-compatibilizing agent such as an emulsifying agent, a protective colloid or a wax. For example, a method for dispersing a polyolefin resin in water by addition of a carboxyl group containing polyolefin wax is stated in Japanese Examined Patent Publication No. SHO58 (1983)-42207. Further, methods for dispersing a polyolefin resin in water with the use of various emulsifying agents are stated in Japanese Unexamined Patent Publications No. SHO62(1987)-252478, No. HEI5(1993)-163420, No. HEI7 (1995)-82423 and No. HEI9(1997)-296081. However, these aqueous dispersions each essentially contain a highly hydrophilic emulsifying agent or a protective colloidal compound. A coating film formed from such an aqueous dispersion is liable to have a significantly reduced water resistance because the emulsifying agent or the protective colloidal compound remains in the coating film after drying thereof. Further, the coating film containing the emulsifying agent or the protective colloidal compound is not preferable environmentally and hygienically with a possibility of bleed-out. Where a low molecular weight compound such as the polyolefin wax or the protective colloidal compound is used in combination with the polyolefin resin, the intrinsic properties of the polyolefin resin are deteriorated. Hence, there is a demand for finely and homogeneously dispersing a polyolefin resin in an aqueous medium virtually without the addition of a compound which may remain in the resulting coating film after drying.

It is an object of the present invention to solve the aforesaid problem and to provide an aqueous polyolefin resin dispersion which is virtually free from a nonvolatile water-compatibilizing agent such as an emulsifying agent or a protective colloidal compound, and excellent in storage stability, low-temperature film formability and blend stability with respect to any other aqueous polymer dispersion and any of various additives with capability of forming a coating film excellent in transparency and water resistance.

DISCLOSURE OF THE INVENTION

As a result of intensive studies to achieve the aforesaid object, the inventors of the present invention have found that, where an aqueous dispersion comprises a polyolefin resin having a specific composition, a basic compound and an aqueous medium, the polyolefin resin can stably be dispersed in the aqueous medium without addition of a nonvolatile water-compatibilizing agent such as an emulsifying agent or a protective colloidal compound even if the content of an unsaturated carboxylic acid in the polyolefin resin is low, and attained the present invention.

The following is the summary of the present invention.

An aqueous polyolefin resin dispersion according to the present invention comprises a polyolefin resin, a basic compound and an aqueous medium, wherein the polyolefin resin comprises a copolymer of an unsaturated carboxylic acid or an anhydride thereof, an ethylenic hydrocarbon and a specific compound, wherein the specific compound is at least one of compounds represented by the following formulae (I) to (IV):

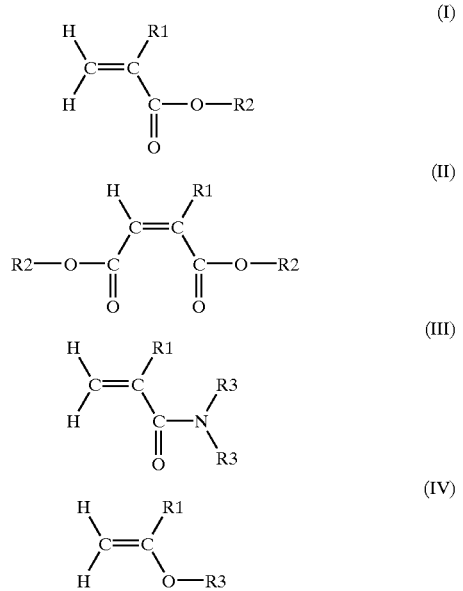

wherein R1 is an hydrogen atom or a methyl group, R2 is an alkyl group having a carbon number of not greater than 10, and R3 is a hydrogen atom or an alkyl group having a carbon number of not greater than 10.

With this arrangement, the polyolefin resin can be dispersed in the aqueous medium as having a number average particle diameter of not greater than 1 μm virtually without addition of a nonvolatile water-compatibilizing agent even if the unsaturated carboxylic acid is contained in the polyolefin resin in a smaller proportion. Therefore, the aqueous dispersion is excellent in storage stability and low-temperature film formability, and is capable of forming a coating film excellent in transparency and water resistance. In addition, the aqueous polyolefin resin dispersion is excellent in blend stability with respect to any other aqueous polymer dispersion or an additive such as metal ions, inorganic particles or a cross-linking agent and, therefore, can advantageously be employed for a variety of applications such as coating agents and anti-corrosive coating materials.

Where the aqueous polyolefin resin dispersion according to the present invention is employed as a coating agent to be applied on a base film, thin coating is possible, and the resulting coated film is excellent in water resistance, cleanliness, alkali resistance, adhesion between the coating film and the base film and heat-sealability, because no nonvolatile water-compatibilizing agent is contained in the aqueous dispersion.

Where the aqueous polyolefin resin dispersion according to the present invention is employed as a coating agent to be applied on a metal material, thin coating is possible, and the resulting coated metal material is excellent in corrosion resistance, alkali resistance, water resistance, solvent resistance, workability and adhesion between the coating film and the metal material, because no nonvolatile water-compatibilizing agent is contained in the aqueous dispersion.

Embodiments

The present invention will hereinafter be described in detail.

An aqueous polyolefin resin dispersion according to the present invention is an aqueous dispersion comprising a specific polyolefin resin, a basic compound and an aqueous medium. The polyolefin resin dispersed in the aqueous medium is required to have a number average particle diameter of not greater than 1 μm. The specific polyolefin resin herein employed can stably be maintained as having a number average particle diameter of not greater than 1 μm in the aqueous medium as described above even if virtually no nonvolatile water-compatibilizing agent is contained. The basic compound serves to neutralize carboxyl groups in the polyolefin resin. Electrical repulsive forces between carboxyl anions generated through the neutralization by the addition of the basic compound prevent the coagulation of particles to impart the aqueous dispersion with storage stability.

The polyolefin resin used in the present invention should mainly comprise a copolymer of an unsaturated carboxylic acid or an anhydride thereof, an ethylenic hydrocarbon and a specific compound. The unsaturated carboxylic acid or the anhydride thereof imparts the resin with a hydrophilic property, and the ethylenic hydrocarbon exhibits characteristic properties as the polyolefin resin. The specific compound supplements an insufficient hydrophilic property of the unsaturated carboxylic acid or the anhydride thereof. The specific compound herein employed is at least one of compounds represented by the following formulae (I) to (IV):

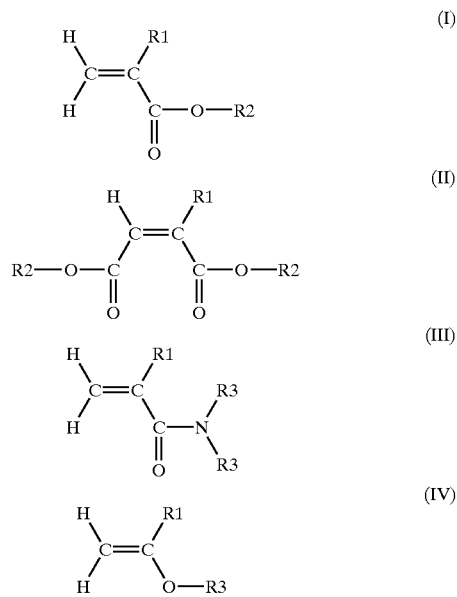

wherein R1 is an hydrogen atom or a methyl group, R2 is an alkyl group having a carbon number of not greater than 10, and R3 is a hydrogen atom or an alkyl group having a carbon number of not greater than 10.

The proportion of the unsaturated carboxylic acid or the anhydride thereof in the copolymer should be not smaller than 0.01 wt % and smaller than 5 wt % on a weight basis. If the proportion of the unsaturated carboxylic acid or the anhydride thereof is smaller than 0.01 wt %, water compatibilization (liquefaction) of the polyolefin resin and the preparation of a proper aqueous dispersion are difficult. On the other hand, if the proportion of the unsaturated carboxylic acid or the anhydride thereof is greater than 5 wt %, the water compatibilization is easier, but the resulting aqueous polyolefin resin dispersion may have a reduced blend stability with respect to any other additives. In addition, where such an aqueous polyolefin resin dispersion is employed as a coating agent, as will be described later, the alkali resistance and the heat sealability may be inferior. Therefore, the proportion of the unsaturated carboxylic acid or the anhydride thereof is preferably not smaller than 0.1 wt % and smaller than 5 wt %, more preferably not smaller than 0.5 wt % and smaller than 5 wt %, optimally not smaller than 1 wt % and not greater than 4 wt %.

The weight ratio of the ethylenic hydrocarbon and the specific compound in the copolymer should be (ethylenic hydrocarbon)/(specific compound)=55/45 to 99/1 (wt %). The ethylenic hydrocarbon as a main component of the polyolefin resin exhibits characteristic properties as the polyolefin resin, and has a water resistance and the like. Therefore, if the ratio of the ethylenic hydrocarbon is smaller than 55 wt %, the characteristic properties as the polyolefin resin cannot sufficiently be provided with a poorer water resistance. If the ratio of the ethylenic hydrocarbon is greater than 99 wt %, the polyolefin resin cannot sufficiently be compatibilized with water, making it difficult to provide a proper aqueous dispersion. Therefore, the weight ratio of the ethylenic hydrocarbon and the specific compound is preferably (ethylenic hydrocarbon)/(specific compound)=60/40 to 98/2 (wt %), more preferably 65/35 to 97/3 (wt %), further more preferably 70/30 to 97/3 (wt %), particularly preferably 75/25 to 97/3 (wt %).

The unsaturated carboxylic acid or the anhydride thereof as a constituent of the polyolefin resin is a compound containing at least one carboxyl group or acid anhydride group in its molecule (monomer unit). Specific examples thereof include acrylic acid, methacrylic acid, maleic acid, maleic anhydride, itaconic acid, itaconic anhydride, fumaric acid, crotonic acid, and half esters and half amides of unsaturated dicarboxylic acids. Among these, acrylic acid, methacrylic acid, maleic acid and maleic anhydride are preferred, and acrylic acid, maleic anhydride and methacrylic acid are particularly preferred. These may be used either alone or in combination. It is merely necessary that the unsaturated carboxylic acid is copolymerized in the polyolefin resin, but the type of the copolymerization is not particularly limited. Examples of the copolymerization include random copolymerization, block copolymerization and graft copolymerization.

In the unsaturated carboxylic acid or the anhydride thereof, an unsaturated carboxylic anhydride unit such as a maleic anhydride unit is in an acid anhydride form with adjacent carboxyl groups dehydrated to be cyclized when the resin is in a dry state. However, the anhydride partly or entirely experiences ring opening in the aqueous medium containing the basic compound and, hence, is liable to be present in the form of a carboxylic acid or a salt thereof. Therefore, where the amount of the basic compound is defined on the basis of the amount of carboxyl groups in the resin, the calculation of the amount of the basic compound is based on the assumption that all the acid anhydride groups in the resin experience the ring opening thereby to be present in the form of carboxyl groups.

The ethylenic hydrocarbon as a constituent of the polyolefin resin is an alkene having a carbon number of 2 to 6, and examples thereof include ethylene, propylene, isobutylene, 1-butene, 1-pentene and 1-hexene, which may be used in combination. Among these, alkenes such as ethylene, propylene, isobutylene and 1-butene having a carbon number of 2 to 4 are preferred, and ethylene is particularly preferred.

The specific compound as a constituent of the polyolefin resin should be at least one of the compounds represented by the above formulae (I) to (IV). With the use of the specific compound having such a structure, the polyolefin resin is imparted with a hydrophilic property. Therefore, the polyolefin resin can finely be compatibilized with water without the addition of the nonvolatile water-compatibilizing agent, even if the proportion of the unsaturated carboxylic acid or the anhydride thereof having a hydrophilic property is smaller than 5 wt % as described above.

Examples of the compound represented by the above formula (I) include (meth)acrylates such as methyl (meth)acrylate, ethyl (meth)acrylate and butyl (meth)acrylate. Examples of the compound represented by the above formula (II) include maleates such as dimethyl maleate, diethyl maleate and dibutyl maleate. Examples of the compound represented by the formula (III) include (meth)acrylamides. Examples of the compound represented by the formula (IV) include alkyl vinyl ethers such as methyl vinyl ether and ethyl vinyl ether, vinyl esters such as vinyl formate, vinyl acetate, vinyl propionate, vinyl pivalate and vinyl versatate, and vinyl alcohols such as obtained by saponifying any of the vinyl esters with a basic compound or the like. The compounds represented by the formulae (I) to (IV) may be used either alone or in combination. Among these compounds, the (meth)acrylates represented by the formula (I) are preferred, and methyl (meth)acrylate and ethyl (meth)acrylate are particularly preferred in the present invention.

Preferred examples of the copolymer of the unsaturated carboxylic acid or the anhydride thereof, the ethylenic hydrocarbon and the specific compound as the polyolefin resin include ethylene-acrylate-maleic anhydride terpolymers and ethylene-methacrylate-maleic anhydride terpolymers. More specific examples of the terpolymers include ethylene-methyl acrylate-maleic anhydride terpolymers, ethylene-ethyl acrylate-maleic anhydride terpolymers, ethylene-methyl methacrylate-maleic anhydride terpolymers and ethylene-ethyl methacrylate-maleic anhydride terpolymers. In the water compatibilization of the resin to be described later, very few ester bonds in the (meth)acrylate units may experience hydrolysis, so that the acrylate units are converted into acrylic acid unit. In this case, it is merely necessary that the ratio of the respective components after the conversion falls within the predefined ranges.

The polyolefin resin preferably has a melt flow rate (serving as an index of molecular weight) of 0.01 to 500 g/10 minutes at 190° C. under a load of 2160 g. If the melt flow rate is smaller than 0.01/10 minutes, the water compatibilization of the resin is difficult so that a proper aqueous dispersion cannot be provided. If the melt flow rate is greater than 500 g/10 minutes, a coating film formed from the resulting aqueous dispersion is liable to be hard and brittle, thereby having a reduced mechanical strength. Therefore, the melt flow rate of the polyolefin resin at 190° C. under a load of 2160 g is preferably 0.1 to 300 g/10 minutes, more preferably 0.1 to 250 g/10 minutes, further more preferably 0.5 to 200 g/10 minutes, optimally 1 to 100 g/10 minutes, in the present invention.

A method for the synthesis of the polyolefin resin is not particularly limited, but it is preferred to use no nonvolatile water-compatibilizing agent in the synthesis of the polyolefin resin to provide the polyolefin resin in the form of an aqueous dispersion as will be described later. The polyolefin resin is obtained by high-pressure radical copolymerization of the constituent monomers of the polyolefin resin in the presence of a radical generating agent. The unsaturated carboxylic acid or the anhydride thereof may be graft-polymerized (graft-modified).

The polyolefin resin may be copolymerized with a small amount of other monomers such as dienes, (meth)acrylonitrile, vinyl halides, vinylidene halides, carbon monoxide and sulfur dioxide.

In the present invention, the polyolefin resin in the aqueous polyolefin resin dispersion should have a number average particle diameter of not greater than 1 μm. If the number average particle diameter of the polyolefin resin is greater than 1 μm, the resulting aqueous dispersion has a reduced storage stability. Further, where the aqueous dispersion is used as a coating agent, the film formability is reduced, making it difficult to form a coating film at a lower temperature on the order of 25° C. Therefore, the number average particle diameter of the polyolefin resin is preferably not greater than 0.5 μm, more preferably not greater than 0.3 μm, further more preferably not greater than 0.2 μm, optimally smaller than 0.1 μm. For a similar reason, the polyolefin resin preferably has a weight average particle diameter of not greater than 1 μm, more preferably not greater than 0.5 μm, further more preferably not greater than 0.3 μm, most preferably not greater than 0.2 μm. A particle dispersion degree obtained by dividing the weight average particle diameter by the number average particle diameter (weight average particle diameter)/(number average particle diameter) is preferably in the range of 1 to 3, more preferably in the range of 1 to 2.5, particularly preferably in the range of 1 to 2, for the storage stability and the low-temperature film formability.

The amount of the basic compound contained in the aqueous polyolefin resin dispersion according to the present invention is preferably 0.5 to 3.0 equivalents based on the carboxylic groups in the polyolefin resin. If the amount of the basic compound is smaller than 0.5 equivalents, the effect of the addition of the basic compound is negligible. If the amount of the basic compound is greater than 3.0 equivalents, the coating film formation requires a longer drying period, and the resulting aqueous dispersion may be colored. Therefore, the amount of the basic compound is more preferably 0.8 to 2.5 equivalents, particularly preferably 1.01 to 2.0 equivalents.

Any basic compound capable of neutralizing the carboxyl groups in the polyolefin resin may be employed as the basic compound. In consideration of the water resistance, preferred examples of the basic compound include ammonia and organic amine compounds which will evaporate in the coating film formation. Among these, the organic amine compounds are particularly preferred because they facilitate the water compatibilization of the polyolefin resin. Such an organic amine compound preferably has a boiling point in the range of 30 to 250° C., more preferably in the range of 50 to 200° C. If the boiling point of the organic amine compound is lower than 30° C., a greater proportion of the organic amine compound is evaporated during the water compatibilization of the polyolefin resin, hindering complete water compatibilization of the polyolefin resin. If the boiling point of the organic amine compound is higher than 250° C., it is difficult to evaporate the organic amine compound away from the resin coating film by drying, so that the water resistance of the coating film is deteriorated.

Specific examples of the organic amine compound include triethylamine, N,N-dimethyl ethanolamine, aminoethanolamine, N-methyl-N,N-diethanolamine, isopropylamine, imino-bis-propylamine, ethylamine, diethylamine, 3-ethoxypropylamine, 3-diethylaminopropylamine, sec-butylamine, propylamine, methylaminopropylamine, methylimino-bis-propylamine, 3-methoxypropylamine, monoethanolamine, diethanolamine, triethanolamine, morpholine, N-methylmorpholine and N-ethylmorpholine.

In the present invention, the aqueous medium is a liquid mainly comprising water, but a water-soluble organic solvent may be contained in the aqueous medium. Although the aqueous polyolefin resin dispersion may not contain the organic solvent, the organic solvent should be contained in the aqueous medium when the polyolefin resin is compatibilized with water. By blending the organic solvent in the aqueous medium, the water compatibilization of the polyolefin resin is promoted, so that the diameters of dispersed particles such as expressed by the number average particle diameter and the weight average particle diameter can be reduced. The organic solvent is preferably present in the aqueous medium in a proportion of not greater than 40 wt %. If the proportion of the organic solvent is greater than 40 wt %, the resulting medium is not virtually regarded as the aqueous medium and is disadvantageous for environmental protection. Further, the storage stability of the aqueous dispersion may be reduced depending on the kind of the organic solvent to be used. Therefore, the proportion of the organic solvent in the aqueous dispersion is preferably in the range of 1 to 40 wt %, more preferably in the range of 2 to 35 wt %, optimally in the range of 3 to 30 wt %.

In general, an organic solvent contained in an aqueous dispersion can partly be evaporated away by an operation called "stripping". The amount of the organic solvent in the aqueous polyolefin resin dispersion according to the present invention can be reduced by this operation. In the present invention, the amount of the organic solvent in the aqueous polyolefin resin dispersion is preferably reduced to not greater than 10 wt %, more preferably not greater than 3 wt % in consideration of environmental issues, by the stripping. For the evaporation of the organic solvent by the stripping, it is necessary to give proper considerations to a production process, for example, to increase a vacuum degree in an apparatus or to increase an operation period. Therefore, the lower limit of the amount of the organic solvent is about 0.01 wt % (which is a detection limit of an analyzer employed for measurement in the present invention) in consideration of the productivity. Even if the amount of the organic solvent is smaller than 0.01 wt % this poses no particular problem to the properties of the aqueous dispersion. The reduction of the amount of the organic solvent by the stripping does not particularly influence the properties of the inventive aqueous polyolefin resin dispersion, so that the aqueous polyolefin resin dispersion can advantageously be used for a variety of applications.

A method for the stripping is such that the aqueous dispersion is heated with stirring at an ordinary pressure or at a reduced pressure to evaporate away the organic solvent. The content of the organic solvent may be determined by gas chromatography. The evaporation of the aqueous medium will increase a solid concentration. Therefore, if there is a possibility that the viscosity of the aqueous dispersion is increased to deteriorate the workability, for example, water may preliminarily be added to the aqueous polyolefin resin dispersion.

The organic solvent employed in the present invention preferably has a boiling point in the range of 30 to 250° C., more preferably in the range of 50 to 200° C. If the boiling point of the organic solvent is lower than 30° C., a greater proportion of the organic solvent is evaporated during the water compatibilization of the polyolefin resin, so that the efficiency of the water compatibilization cannot sufficiently be increased. If the boiling point of the organic solvent is higher than 250° C., it is difficult to evaporate the organic solvent away from the resin coating film by drying, so that the coating film is liable to have a poorer water resistance.

The organic solvent employed in the present invention preferably has, in its molecule, at least one atom such as oxygen, nitrogen, fluorine or chlorine, which has a Pauling electronegativity of not smaller than 3.0 to ensure that the aqueous polyolefin resin dispersion has an excellent storage stability. Further, the organic solvent preferably has a solubility of not lower than 5 g/L, more preferably not lower than 10 g/L, in water at 20° C.

Specific examples of the organic solvent employed in the present invention include alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol, ketones such as methyl ethyl ketone, methyl isobutyl ketone, ethyl butyl ketone, cyclohexanone and isophorone, ethers such as tetrahydrofuran and dioxane, esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate, glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ether acetate, 3-methoxy-3-methyl butanol, 3-methoxybutanol, acetonitrile, dimethylformamide, dimethylacetamide, diacetone alcohol, and ethyl acetoacetate, which may be used in combination.

Among these organic solvents, ethanol, n-propanol, isopropanol, n-butanol, methyl ethyl ketone, cyclohexanone, tetrahydrofuran, dioxane, ethylene glycol monoethyl ether, ethylene glycol monopropyl ether and ethylene glycol monobutyl ether are preferred because they are highly effective for promotion of the water compatibilization of the polyolefin resin and easily removed from the aqueous medium, and ethanol, n-propanol and isopropanol are particularly preferred, from the viewpoint of low-temperature drying.

The proportion of the resin in the aqueous polyolefin resin dispersion according to the present invention is properly selected depending on film forming conditions, the thickness and properties of an intended resin coating film, but not particularly limited. However, the proportion of the resin in the aqueous dispersion is preferably in the range of 1 to 60 wt %, more preferably in the range of 3 to 55 wt %, further more preferably in the range of 5 to 50 wt %, optimally in the range of 10 to 45 wt %, to properly maintain the viscosity and to ensure proper coating film formation.

Since the inventive aqueous polyolefin resin dispersion having the aforesaid formulation contains the unsaturated carboxylic acid in a smaller amount, the aqueous dispersion has an excellent blend stability with respect to an additional aqueous, dispersion of a polymer other than the polyolefin resin and any of various additives such as a cross-linking agent, metal ions and inorganic particles.

The additional aqueous dispersion of the polymer other than the polyolefin resin is not particularly limited, but examples thereof include aqueous dispersions of polyvinyl acetates, ethylene-vinyl acetate copolymers, polyvinyl chlorides, polyvinylidene chlorides, ethylene-(meth)acrylic acid copolymers, styrene-maleic acid resins, styrene-butadiene resins, butadiene resins, acrylonitrile-butadiene resins, poly(meth)acrylonitrile resins, (meth)acrylamide resins, chlorinated polyethylene resins, chlorinated polypropylene resins, polyester resins, modified nylon resins, urethane resins, phenol resins, silicone resins and epoxy resins. These may be used either alone or in combination.

Usable as the cross-linking agent are cross-linking agents having a self cross-linking property, compounds each having a plurality of functional groups reactive with carboxyl groups in a molecule thereof, and metal complexes each having polyvalent coordination seats. Preferred examples of the cross-linking agent include isocyanate compounds, melamine compounds, benzoguanamine compounds, urea compounds, epoxy compounds, oxazoline group containing compounds, carbodiimide compounds, zirconium salt compounds and silane coupling agents. Among these, the melamine compounds, the epoxy compounds, the oxazoline group containing compounds, the zirconium salt compounds and the silane coupling agents are particularly preferred in consideration of application to a metal material to be described later, because they enhance the corrosion resistance of the metal material to be coated. These cross-linking agents may be used either alone or in combination.

By thus blending the cross-linking agent in the aqueous polyolefin resin dispersion, coating film properties, such as water resistance and solvent resistance, of the aqueous polyolefin resin dispersion can further be improved. The proportion of the cross-linking agent is preferably in the range of 0.01 to 100 parts by weight, more preferably 0.1 to 60 parts by weight, particularly preferably 0.1 to 30 parts by weight, based on 100 parts by weight of the polyolefin resin. If the proportion of the cross-linking agent is smaller than 0.01 parts by weight, the coating film properties are less liable to be improved. If the proportion of the cross-linking agent is greater than 100 parts by weight, the workability and the like tends to be deteriorated.

The metal ions to be added to the aqueous polyolefin resin dispersion according to the present invention are not particularly limited, but those capable of imparting the aqueous dispersion with corrosion resistance are preferred. In general, if any of various metal ions are added to an aqueous dispersion imparted with particle dispersion stability by electrical repulsive forces of carboxyl anions and the like, dispersed particles are coagulated, resulting in deterioration of the storage stability of the aqueous dispersion. However, the inventive aqueous polyolefin resin dispersion is free from the coagulation of the particles with an excellent storage stability, even if a proper amount of the metal ions are added to the aqueous dispersion. The kind of the metal ions is properly selected depending on the purpose, and not particularly limited. Examples of the metal ions include ions of lithium, sodium, calcium, barium, magnesium, zinc, copper, cobalt and aluminum. These may be used either alone or in combination. The amount of the metal ions to be added is not particularly limited, but preferably in the range of 10 to 90 mol %, more preferably 20 to 80 mol %, based on the amount of the carboxyl groups in the polyolefin resin to provide a corrosion preventing effect. If the amount of the metal ions is smaller than 10 mol %, the corrosion preventing effect is less liable to be improved. If the amount of the metal ions is greater than 90 mol %, the storage stability of the resulting aqueous dispersion as a coating agent may be deteriorated.

Usable as the inorganic particles to be added to the aqueous polyolefin resin dispersion according to the present invention are particles of metal oxides such as magnesium oxide, zinc oxide and tin oxide, calcium carbonate and silica. Besides the inorganic particles, a layered inorganic compound may be added. Examples of the layered inorganic compound include water-swellable layered inorganic compounds such as vermiculite, montmorilonite, hectorite and synthetic mica. The inorganic particles or the layered inorganic compound preferably have an average particle diameter of 0.003 to 10 μm, more preferably 0.003 to 5 μm, furthermore preferably 0.003 to 1 μm, particularly preferably 0.003 to 0.3 μm, for the storage stability of the aqueous dispersion and the transparency of the coating film. The particulate inorganic materials may be used in combination.

Where the aqueous polyolefin resin dispersion according to the present invention is used as a coating agent for a metal material to be described later, polyvalent metal ions, inorganic particles, any of the aforesaid cross-linking agents and/or a phosphate compound are preferably added to the aqueous polyolefin resin dispersion in consideration of the corrosion resistance. From the viewpoint of the corrosion preventing effect, the addition of silica, the layered inorganic compound and/or the phosphate compound is preferred, and the addition of silica and/or the phosphate compound is most preferred. From the viewpoint of the dispersibility, silica is used in the form of colloidal silica. These may be used either alone or in combination.

The amount of the inorganic particles to be added is preferably 1 to 1000 parts by weight, more preferably 2 to 100 parts by weight, further more preferably 3 to 50 parts by weight, particularly preferably 5 to 30 parts by weight, based on 100 parts by weight of the polyolefin resin. If the amount of the inorganic particles to be added is smaller than 1 part by weight, the corrosion preventing effect is less liable to be improved. If the amount of the inorganic particles to be added is greater than 1000 parts by weight, the resulting aqueous dispersion may have poorer adhesion to the metal material or fail to provide a uniform coating film. For improvement of the dispersibility of the inorganic particles, a coating composition obtained by adding the inorganic particles to the aqueous dispersion is preferably subjected to a homogenizer process, a ball mill process, a paint shaker process or a high pressure dispersing process such as jet disintegrating process.

As the phosphate compound, metal phosphate compounds are preferred, among which polyvalent metal phosphate compounds are particularly preferred for corrosion prevention. Examples of the metal phosphate compounds include zinc phosphate and aluminum phosphate. The term "phosphate" herein means phosphates in a broader sense, including orthophosphates, polyphosphates and metaphosphates, and the phosphate compound may have any of these phosphate structures. The amount of the phosphate compound to be added is preferably 1 to 80 parts by weight, more preferably 3 to 80 parts by weight, further more preferably 5 to 70 parts by weight, particularly preferably 10 to 70 parts by weight, based on 100 parts by weight of the polyolefin resin. If the amount of the metal phosphate compound to be added is smaller than 1 part by weight, the corrosion preventing effect is less liable to be improved. If the amount of the metal phosphate to be added is greater than 80 parts by weight, the adhesion to the metal material and the workability are liable to be reduced.

As required, any of various agents including a leveling agent, a defoaming agent, a skim preventing agent, a pigment dispersant and a UV absorbing agent, and a pigment such as titanium oxide, zinc white or carbon black or a dye may be added to the inventive aqueous polyolefin resin dispersion for use as a coating agent, an anti-corrosive coating agent, an adhesive or a paint. Besides, an organic or inorganic compound other than those described above may be added to the aqueous dispersion, as long as the storage stability of the aqueous dispersion is not deteriorated.

The additives including the aforesaid additional aqueous polymer dispersion, the metal ions, the inorganic particles, the cross-linking agent, the leveling agent, the defoaming agent, the skim preventing agent, the pigment dispersant, the UV absorbing agent, the pigment and the dye may be used either alone or in combination.

The inventive aqueous polyolefin resin dispersion can be applied to a very small thickness with an excellent film formability at room temperatures. Even if a coating film is formed at a temperature of 25° C. or lower, the coating film is highly transparent and excellent in water resistance, because the coating film contains no nonvolatile water-compatibilizing agent. Although the inventive aqueous polyolefin resin dispersion thus has an excellent low-temperature film formability, it is more preferred that the lowest film formable temperature is not higher than 25° C. In the present invention, the expression "the lowest film formable temperature is not higher than 25° C." means that, where the aqueous polyolefin resin dispersion is applied to a thickness of 2 μm on a PET base film having a haze of 2.0 to 5.0 (%) at a room temperature (25° C.) and dried at a temperature of 25° C. for formation of a coating film, the coating film has a haze of not greater than 10.0 (%).

The inventive aqueous polyolefin resin dispersion contains the polyolefin resin having a smaller number average particle diameter and is provided in a liquid form, so that the aqueous dispersion can be applied to a very small thickness on a surface of a base. The thickness of the coating film formed from the inventive aqueous polyolefin resin dispersion after drying is properly selected depending on the application thereof, but preferably in the range of 0.01 to 100 μm, more preferably in the range of 0.01 to 50 μm, further more preferably in the range of 0.01 to 30 μm, particularly preferably in the range of 0.01 to 10 μm. The resin coating film formed as having a thickness in the aforesaid range is highly uniform.

The inventive aqueous polyolefin resin dispersion is highly excellent in water resistance, and excellent in adhesion to various types of base films and metal materials and workability. Therefore, the inventive aqueous dispersion can advantageously be employed for various applications such as coating agents, anti-corrosive coating agent and adhesives.

Usable as the base material on which the coating agent is applied are thermoplastic resin films and metal materials.

Preferred Examples of the thermoplastic films include films and laminates of polyamide resins such as nylon 6 (hereinafter referred to as "Ny6"), nylon 66 and nylon 46, polyester resins such as polyethylene terephthalates (hereinafter referred to as "PET"), polyethylene naphthalates, polytrimethylene terephthalates, polytrimethylene naphthalates, polybutylene terephthalates and polybutylene naphthalates, polyolefin resins such as polypropylenes (hereinafter referred to as "PP") and polyethylenes, polyimide resins, polycarbonate resins and polyarylate resins, and blends thereof. Among these, the PET, the Ny6, the PP, the polyethylenes, the polyimides and the polyarylates are preferably used, and the PET, the Ny6 and the PP are more preferably used. Such a thermoplastic film may be an unstretched film or a stretched film, and the production method therefor is not particularly limited. The thickness of the thermoplastic film is not particularly limited, but typically in the range of 1 to 500 μm.

The metal materials are not particularly limited, but zinc-plated steel materials, copper materials and aluminum materials are preferably employed for a higher corrosion preventing effect. Exemplary plating methods for the zinc-plated steel materials are an electric plating method, a melt plating method and the like, and any of these methods may be employed. The surface of such a zinc-plated steel material may be subjected to a chemical treatment. Although a chromium-free chemical liquid is preferably used for the chemical treatment in consideration of environmental issues, the coating agent employing the inventive aqueous resin dispersion can impart a corrosion resistance to a zinc-plated steel material subjected to a chromate treatment. The zinc-plated steel materials are typically used in a plate form, while the copper materials are used in a plate form or a wire form. The aluminum materials are used in a foil form, a sheet form or a plate form.

Where the coating agent according to the present invention is applied to the aforesaid base materials, any of known film forming methods may be employed because the inventive coating agent is excellent in film formability. Exemplary methods for applying the coating agent include gravure roll coating, reverse roll coating, wire bar coating, lip coating, air knife coating, curtain flow-coating, spray coating, dip coating and brush coating. The coating-agent is applied on a surface of any of the various base materials by any of these coating methods and, as required, set at around a room temperature. Then, the resulting base material is subjected to a heat treatment for drying or for drying and baking. Thus, a uniform resin coating film can be formed in intimate contact with the surface of the base material.

A heating device to be used at this time may be an oven of an ordinary hot air circulation type, an infrared heater and the like. The heating temperature and the heating period are properly be selected depending on the characteristics of the base material to be coated and the type and amount of a curing agent to be described later. Where the thermoplastic resin film is employed as the base material, the heating temperature is preferably 30° C. to the melting point of the resin of the film, more preferably 60° C. to the melting point of the resin of the film, particularly preferably 80° C. to the melting point of the resin of the film, in consideration of the economy. Where the metal material is employed as the base material, the heating temperature is preferably in the range of 30 to 250° C., more preferably in the range of 60 to 230° C., particularly preferably in the range of 80 to 210° C. The heating period is preferably 1 second to 20 minutes, more preferably 5 seconds to 15 minutes, particularly preferably 5 second to 10 minutes, regardless of the kind of the base material. Where the cross-linking agent is added to the aqueous polyolefin resin dispersion, it is desirable to properly select the heating temperature and period depending on the type of the cross-linking agent to ensure sufficient reaction between carboxyl groups in the polyolefin and the cross-linking agent.

A coated film produced by applying the aqueous polyolefin resin dispersion on at least one surface of the thermoplastic film employed as the base material can be imparted with heat sealability at a relatively low temperature, because the resulting polyolefin resin layer is excellent in adhesion to the various thermoplastic resin films.

The dried coating film preferably has a thickness in the range of 0.01 to 10 $\mu$m. If the thickness of the dried coating film is smaller than 0.01 $\mu$m, the resulting coated film is excellent in transparency, but fails to have a sufficient heat sealability. The coated film according to the present invention is excellent in various properties including the heat-sealability even if the dried coating film thereof has a thickness of not greater than 10 $\mu$m. Hence, there is no need for applying the aqueous dispersion to a thickness of greater than 10 $\mu$m unless otherwise required. Therefore, the thickness of the dried coating film is preferably in the range of 0.01 to 10 $\mu$m, more preferably in the range of 0.02 to 9 $\mu$m, particularly preferably in the range of 0.03 to 9 $\mu$m.

For the production of the coated film, it is preferred that the aqueous dispersion is applied to at least one surface of the thermoplastic resin film and then the resulting film is stretched longitudinally and/or transversely. Where the coating process is performed prior to the stretching, the coating agent is first applied on an unstretched film and dried, and the resulting film is fed into a tenter-type stretching machine so as to be subjected to a simultaneous biaxial stretching process for stretching the film simultaneously in a film feeding direction and in a widthwise direction and subjected to a heat treatment. Alternatively, a film is first stretched in a film feeding direction with the use of a multi-step heat roll, and the coating agent is applied on the film and dried. Then, the resulting film is stretched in a widthwise direction by means of a tenter-type stretching machine (sequential biaxial stretching). It is also possible to combine the stretching in the film feeding direction and the simultaneous biaxial stretching by means of the tenter.

In the case of a coated metal material produced by applying the coating agent on at least one surface of the metal material employed as the base material, the dried coating film exhibits an excellent corrosion resistance.

In the case of the coated metal material, the dried coating film preferably has a thickness in the range of 0.1 to 10 $\mu$m. In consideration of the corrosion resistance, the transparency, the workability and the like, the thickness of the dried coating film is preferably in the range of 0.2 to 8 $\mu$m, particularly preferably in the range of 0.2 to 5 $\mu$m. If the thickness of the dried coating film is smaller than 0.1 $\mu$m, the corrosion preventing effect is mitigated.

The coated film and the coated metal material described above are excellent not only in heat sealability and corrosion resistance but also in water resistance, transparency, alkali resistance, solvent resistance, workability and cleanliness, because virtually no nonvolatile water-compatibilizing agent is contained in the coating films thereof.

In the present invention, the expression. "virtually no nonvolatile water-compatibilizing agent is contained" means that, when the inventive aqueous polyolefin resin dispersion is prepared, the nonvolatile water-compatibilizing agent is not positively added to the system and, as a result, the aqueous dispersion is free from the nonvolatile water-compatibilizing agent. It is particularly preferred that the content of the nonvolatile water-compatibilizing agent is zero, but the aqueous dispersion may contain the nonvolatile water-compatibilizing agent in a proportion of smaller than 0.1 wt % based on the amount of the polyolefin resin as long as the effects of the present invention are not impaired.

The term "water-compatibilizing agent" herein means an agent or a compound to be added to the aqueous dispersion for the promotion of the water compatibilization and the stabilization of the aqueous dispersion in the preparation of the aqueous dispersion. The term "nonvolatile" herein means that the water-compatibilizing agent has a high boiling point (e.g., a boiling point of not lower than 300° C.) or no boiling point at an ordinary pressure.

In the present invention, examples of the nonvolatile water-compatibilizing agent include emulsifying agents, protective colloidal compounds, modified waxes, modified acids having higher acid values and water-soluble polymers.

Examples of the emulsifying agents include cationic emulsifying agents, anionic emulsifying agents, nonionic emulsifying agents and ampholytic emulsifying agents which are generally used for emulsion polymerization, and surface active agents. Examples of the anionic emulsifying agents include sulfates of higher alcohols, higher alkyl sulfonates, higher carboxylates, alkylbenzene sulfonates, polyoxyethylene alkyl sulfates, polyoxyethylene alkyl phenyl ether sulfates and vinyl sulfosuccinate. Examples of the nonionic emulsifying agents include polyoxyethylene alkyl ethers, polyoxyethylene alkyl phenyl ethers, polyethylene glycol fatty esters, ethylene oxide-propylene oxide block copolymers, polyoxyethylene fatty amides, ethylene oxide-propylene oxide copolymers, which each have a polyoxyethylene structure, and sorbitan derivatives. Examples of the ampholytic emulsifying agents include laurylbetaine and lauryldimethylamine oxide, which are generally used as particle dispersion stabilizers.

Examples of the protective colloidal compounds include polyvinyl alcohols, carboxyl-modified polyvinyl alcohols, carboxymethylcellulose, hydroxyethylcellulose, hydroxypropylcellulose, modified starch and polyvinyl pyrrolidone, which are generally employed as particle dispersion stabilizers.

Examples of the modified waxes include acid modified polyolefin waxes such as carboxyl-containing polyethylene waxes, carboxyl-containing polypropylene waxes and carboxyl-containing polyethylene-propylene waxes, which each typically have a number average molecular weight of not greater than 5000, and salts thereof.

Examples of the acid modified compounds having high acid values include acrylic acid-maleic anhydride copolymers and salts thereof, carboxyl-containing compounds such as styrene-(meth)acrylic acid copolymers, ethylene-(meth) acrylic acid copolymers, isobutylene-maleic anhydride alternating copolymers and (meth)acrylic acid-(meth)acrylate copolymers, which each contain an unsaturated carboxylic acid in a proportion of not smaller than 10 wt %, and salts thereof.

Examples of the water-soluble polymers include polyacrylic acids and salts thereof, polyitaconic acids and salts thereof, water-soluble acrylic copolymers having amino groups, gelatin, Arabian rubber and casein, which are generally used as particle dispersion stabilizers.

For adjusting the thickness of the dried coating film in the present invention, it is preferred to properly select a coating device and coating conditions and to use the aqueous dispersion in a concentration suitable for the intended dried coating thickness. The concentration of the aqueous dispersion can be adjusted by properly determining the formulation of the aqueous dispersion in the preparation of the aqueous dispersion. Alternatively, the aqueous dispersion once prepared may properly be diluted or concentrated for the adjustment of the concentration.

Since the coating film obtained by drying the inventive aqueous, dispersion is excellent in adhesion to various base materials, the aqueous dispersion can be used as an adhesive by properly adjusting the concentration thereof. For example, the aqueous dispersion may be applied to a metal, a glass, a plastic product, a film, a paper sheet and the like.

Next, an explanation will be given to a preparation method for the aqueous polyolefin resin dispersion according to the present invention.

The preparation method for the inventive aqueous polyolefin resin dispersion is not particularly limited. One exemplary method is such that the polyolefin resin having the specific composition and the aqueous medium containing the basic compound and the organic solvent according to the present invention are stirred in a sealable vessel with heating. This method is most preferred. According to this method, the polyolefin resin can properly be dispersed as having a number average particle diameter of not greater than 1 $\mu$m virtually without the addition of the nonvolatile water-compatibilizing agent.

An apparatus for preparing the inventive aqueous polyolefin resin dispersion includes a vessel for containing a liquid, and is capable of properly stirring a mixture of the aqueous medium and the resin in a powdery or granular form fed into the vessel. Usable as the apparatus for the preparation are a solid/liquid stirring machine and an emulsifying machine widely known to those skilled in the art. The apparatus is preferably capable of pressurization to 0.1 MPa or higher. The stirring method and the rotation speed for the stirring are not particularly limited.

The aqueous medium containing water, the basic compound and the organic solvent and the granular or powdery polyolefin resin are fed in the vessel of the apparatus, and mixed together preferably at a temperature of not higher than 40° C. with stirring. The shape of the polyolefin resin to be compatibilized with water is not particularly limited, but the polyolefin resin is in a granular form having a granule diameter of not greater than 1 cm, preferably not greater than 0.8 cm, or in a powdery form for acceleration of the water compatibilization.

Then, the resulting mixture is continuously stirred while the temperature inside the vessel is kept at 80 to 200° C., preferably at 90 to 200° C., more preferably at 100 to 200° C., whereby the polyolefin resin is sufficiently compatibilized with water. The stirring period is preferably 5 to 120 minutes. If the temperature inside the vessel is lower than 80° C., the water compatibilization of the polyolefin resin is difficult. If the temperature inside the vessel is higher than 200° C., the molecular weight of the polyolefin resin may be reduced. For heating the inside of the vessel, it is preferred to externally heat the vessel, for example, by employing an oil or water or by attaching a heater to the vessel.

Thereafter, the mixture is cooled to not higher than 40° C. with stirring. Thus, the aqueous dispersion is obtained. Exemplary methods for cooling the inside of the vessel are to spontaneously cool the vessel at a room temperature or to cool the vessel by employing an oil or water at 0 to 40° C.

After the cooling, the aqueous dispersion may be subjected to a jet disintegrating process as required. The jet disintegrating process herein means that a fluid such as the aqueous polyolefin resin dispersion is jetted from a small aperture such as a nozzle or a slit under a high pressure to cause the resin particles to collide against each other or against a collision plate or the like for further finely disintegrating the resin particles by a mechanical energy. Specific examples of an apparatus for the jet disintegrating process include a homogenizer available form A. P. V. Gaulin Corporation and a microfluidizer M-110E/H available from Mizuho Industry Co., Ltd.

The inventive aqueous polyolefin resin dispersion prepared in the aforesaid manner is provided in a homogeneous liquid form in which the polyolefin resin is dispersed or dissolved in the aqueous medium. The expression "the aqueous dispersion is provided in a homogeneous liquid form" means that the aqueous dispersion is free from sedimentation, phase separation and skinning without locally different solid concentrations when visually observed.

An exemplary method for the adjustment of the solid concentration of the aqueous polyolefin resin dispersion is to evaporate the aqueous medium away from the aqueous dispersion or dilute the aqueous dispersion with water to a desired solid concentration.

The water compatibilization ratio of the aqueous polyolefin resin dispersion can be determined on the basis of the amount of coarse particles remaining in the prepared aqueous polyolefin resin dispersion. More specifically, the aqueous dispersion is pressure-filtered through a 300-mesh stainless filter (plane weave having a filament diameter of 0.035 mm) at an air pressure of 0.2 MPa, and the amount of the resin remaining on the filter is measured. The water compatibilization ratio of the aqueous polyolefin resin dispersion may slightly be reduced depending on the conditions, but is generally very high, so that the water compatibilization of the resin can be achieved with virtually no coarse particle residue.

Even if the water compatibilization ratio is lower with a greater amount of the resin remaining on the filter, the coarse particles can be removed from the aqueous dispersion by the aforesaid pressure filtration in the preparation process, and the resulting aqueous dispersion can be used in the subsequent process.

The aqueous polyolefin resin dispersion prepared in the aforesaid manner is excellent in low-temperature film formability, so that a transparent coating film can be formed under drying conditions at a temperature of not higher than the melting point of the resin as described above.

EXAMPLES

The present invention will hereinafter be described more specifically by way of examples thereof. However, the invention is not limited to these examples. Various properties were determined or evaluated in the following manner.

(1) Composition of Polyolefin Resin

The composition of the polyolefin resin was determined at 120° C. at 300 MHz in o-dichlorobenzene ($d_4$) by means of a $^1$H-NMR analyzer (available from Varian, Inc.).

(2) Melt Flow Rate (g/10 Minutes)

The melt flow rate was determined at 190° C. under a load of 2160 g in conformity with a method specified in JIS-6730.

(3) Melting Point (° C.)

The melting point was determined by means of a differential scanning calorimeter (Model DSC-7 available from Perkin Elmer Corporation).

(4) Ratio (%) of Water Compatibilization.

The aqueous dispersion obtained after the water compatibilization was filtered through a 300-mesh stainless filter (plane weave having a filament diameter of 0.035 mm), and the weight of the resin remaining on the filter was determined. Then, the ratio of the water compatibilization was calculated on the basis of the weight of the fed resin.

(5) Appearance of Aqueous Dispersion

The appearance of the aqueous dispersion was evaluated by visually observing the tone of the aqueous dispersion.

(6) Solid Concentration (wt %) of Aqueous Polyolefin Resin Dispersion

For the determination of the polyolefin resin solid concentration, a proper amount of the aqueous polyolefin dispersion was weighed, and heated at 150° C. until the weight of a residue (solid component) plateaued.

(7) Viscosity of Aqueous Polyolefin Resin Dispersion

The rotational viscosity of the aqueous dispersion was determined at a temperature of 20° C. by means of a DVL-BII digital viscometer (B-type viscometer available from Tokimec, Inc.).

(8) Average Particle Diameter ($\mu$m) of Polyolefin Resin Particles

The number average particle diameter (mn) and a weight average particle diameter (mw) were determined by means of a microtrack particle size distribution analyzer UPA150 (Model NO. 9340 available from Nikkisou Co., Ltd).

(9) Pot Life

The pot life was evaluated on the following two criteria by observing the appearance of the aqueous polyolefin resin dispersion after the aqueous dispersion was allowed to stand at a room temperature for 90 days.

◯: No Change was Observed in Appearance.

X: Solidification, Coagulation or Sedimentation was Observed.

(10) Water Resistance of Coating Film and Coated Film

The aqueous dispersion was applied on a 12-$\mu$m thick biaxially stretched PET film (EMBLET PET12 available from Unitika, Ltd.) by means of a Myer bar so as to provide a dried coating thickness of about 1 $\mu$m, and dried at 200° C. for two minutes. The coated film thus obtained was immersed in water for one day. Then, the coating layer was visually observed to be checked for dissolution and separation thereof, and evaluated on the following criteria.

◯: No Change was Observed in Appearance.

X: The Dissolution or Separation of the Coating Layer was Observed.

(11) Melt Flow Rate (MFR) After Water Compatibilization

The aqueous polyolefin dispersion was sampled on a laboratory dish, and dried at 100° C. for six hours. The MRF of the resulting polyolefin resin was determined at 190° C. under a load of 2160 g in conformity with a method specified in JIS 6730.

(12) Ratio (%) of Residual Ester Groups After Water Compatibilization

The aqueous polyolefin dispersion after the water compatibilization was dried at 150° C., and then the ratio (%) of residual ester groups was determined at 120° C. at 300 MHz in o-dichlorobenzene ($d_4$) by means of a $^1$H-NMR analyzer (available from Varian, Inc.) with the amount of ester groups in an acrylate before the water compatibilization being defined as 100.

(13) Haze (%)

The haze was determined by means of a turbidity/haze meter (NDH2000 available from Nippon Denshoku Kogyo Co., Ltd.) in conformity with a method specified in JIS K7105. For the determination of the haze of the coated film, the aqueous polyolefin resin dispersion was applied on a 12-$\mu$m thick PET film (EMBLET PET12 available from Unitika, Ltd.) having a haze of 2.8% by means of a Myer bar so as to provide a dried coating thickness of 2 $\mu$m, and allowed to stand in a 25° C. atmosphere for three days for drying, whereby the coated film was produced. Then, the haze of the entire coated film thus produced was measured.

(14) Blend Stability of Aqueous Polyolefin Resin Dispersion with Respect to Other Additives After the aqueous polyolefin resin dispersion was mixed with any other additive, the resulting mixture was allowed to stand. The blend stability was determined as the number of days elapsed before a change in the appearance of the mixture (viscosity increase, solidification, coagulation or sedimentation) occurred.

(15) Content of Organic Solvent in Aqueous Polyolefin Resin Dispersion

The aqueous dispersion or a dispersion obtained by diluting the aqueous dispersion with water was injected directly into a gas chromatograph (GC-8A available from Shimadzu Corporation) for determination of the content of the organic solvent. The detection limit was 0.01 wt %. A column having a size of φ3 mm×3 m and an FID detector were used in the gas chromatograph. Nitrogen was used as a carrier gas, and 60/80-mesh PEG-HT (5%)-UNIPORT HP (available from GL Science, Inc.) was used as a column filler. An internal reference substance was n-butanol. A specimen feeding temperature (injection temperature) was 150° C., and a column temperature was 60° C.

(16) Adhesion Evaluation of Coated Film

The adhesion was evaluated by a cross-cut tape peeling method in conformity with JIS K5400 8.5.2. That is, an adhesive tape applied on 100 square coating portions (1 mm×1 mm) of the coated film was peeled off, and the number of remaining coating portions was counted for the evaluation. The expression "n/100" means that n square portions out of the 100 square portions remained after the test.

(17) Alkali Resistance of Coated Film

An aqueous NaOH solution adjusted at pH 12.0 (20° C.) was kept at 65° C. The coated film was allowed to stand at a room temperature for one day, and then immersed in the aqueous solution for three minutes. Thereafter, the coated film was rinsed with water. Then, the alkali resistance was evaluated on the following criteria by visually observing the state of the resulting coating film.

○: No Change was Observed.

X: Dissolution or Separation of the Coating Film was Observed.

(19). Heat-Seal Strength (N/15 mm) of Coated Film

A pair of coated films were laminated with coating layers thereof in contact with each other, and pressed at a sealing pressure of 0.3 MPa for two seconds by means of a heat press machine. The press temperatures were 100° C. and 120° C. The resulting laminate film was cut to a width of 15 mm and, after a lapse of one day, the peel strength of the coating films were measured at a pulling rate of 200 mm/minute at a pulling angle of 180 degrees by means of a tensile tester (INTESCO Precision Universal Material Tester Model 2020 available from Intesco Corporation).

(20) Evaluation of Corrosion Resistance of Coated Metal Material

The coated metal material was allowed to stand at a room temperature for one day. Then, a 5 wt % NaCl aqueous solution was sprayed over the coated metal material at 35° C. by means of a salt water spray tester designed in conformity with JIS Z-2371. After a lapse of 100 hours, the corrosion resistance was evaluated on the basis of the area of a rusted portion on the coating film on the following criteria.

◎: The Area Ratio of the Rusted Portion was Lower than 5%.

○: The Area Ratio of the Rusted Portion was not Lower than 5% and Lower than 10%.

X: The Area Ratio of the Rusted Portion was not Lower than 50%.

(21) Evaluation of Alkali Resistance of Coated Metal Material

An NaOH aqueous solution adjusted at pH 12.0 at 20° C. was heated at 45° C., with stirring, and the coated metal material was immersed in the aqueous solution for three minutes. Thereafter, the coated metal material was rinsed with water. Then, the alkali resistance was evaluated on the following criteria by visually observing the state of the resulting coating film.

○: No Change was Observed.

X: Dissolution or Separation of the Coating Film was Observed.

(22) Evaluation of Water Resistance of Coated Metal Material

The coated metal material was allowed to stand at a room temperature for one day. Thereafter, the coating film was rubbed several times with a cloth moistened with water. The water resistance was evaluated on the following criteria by visually observing the state of the coating film.

○: No Change was Observed.

X: The Coating Film was Hazed.

(23) Evaluation of Solvent Resistance of Coated Metal Material

The coated metal material was allowed to stand at a room temperature for one day. Thereafter, the coating film was rubbed several times with a cloth moistened with ethanol. The solvent resistance was evaluated on the following criteria by visually observing the state of the coating film.

○: No Change was Observed.

X: The Coating Film was Hazed.

(24) Evaluation of Workability of Coated Metal Material

The coated metal material was allowed to stand at a room temperature for one day. Thereafter, the coated metal material was bent with surface portions thereof opposite from the coated surface brought into contact with each other, and a bent portion thereof was checked for cracks. A symbol ○ indicates that the coated metal material was excellent in workability with no crack.

(25) Adhesion Evaluation (I) of Coated Metal Material (Cross-Cut Tape Peeling)

The coated metal material was allowed to stand at a room temperature for one day. Thereafter, the adhesion was evaluated by a cross-cut tape peeling method in conformity with JIS K5400 8.5.2. That is, an adhesive tape applied on 100 square coating portions (1 mm×1 mm) of the coated film was peeled off, and the number of remaining coating portions was counted for the evaluation. The expression "n/100" means that n square portions out of the 100 square portions remained after the test.

(26) Adhesion Evaluation (II) of Coated Metal Material (Erichsen Process)

The coated metal material was allowed to stand at a room temperature for one day. Thereafter, the coating surface was subjected to an Erichsen process (8 mm), and then an adhesive tape was applied on the processed portion and forcibly peeled off. The state of the coating film was visually observed. A symbol ○ indicates that the coating film was not peeled off with excellent adhesion.

The composition and properties of polyolefin resins employed in the following examples and comparative examples are shown in Table 1.

TABLE 1

| | Composition of polyolefin resin (wt %) | | | | | |
|---|---|---|---|---|---|---|
| | Ethylene | Ethyl acrylate | Acrylic acid | Maleic anhydride | Melt flow rate (g/10 min) | Melting point (° C.) |
| BONDINE HX-8210 (A) | 91 | 6 | 0 | 3 | 200 | 100 |
| BONDINE HX-8290 (B) | 80 | 18 | 0 | 2 | 65 | 81 |

TABLE 1-continued

| | Composition of polyolefin resin (wt %) | | | | Melt flow rate (g/10 min) | Melting point (° C.) |
|---|---|---|---|---|---|---|
| | Ethylene | Ethyl acrylate | Acrylic acid | Maleic anhydride | | |
| BONDINE TX-8030 (C) | 85 | 12 | 0 | 3 | 3 | 95 |
| BONDINE LX-4110 (D) | 91 | 7 | 0 | 2 | 5 | 107 |
| ESCOL TR-5100 (E) | 89 | 0 | 11 | 0 | 8 | 99 |
| Poly(ethylene-maleic anhydride) (F) | 97 | 0 | 0 | 3 | — | 105 |
| PRIMACOL 5980 I (G) | 80 | 0 | 20 | 0 | 300 | 79 |

Example 1

An aqueous polyolefin resin dispersion was prepared by employing a stirrer having a glass vessel with a heater. The glass vessel was a sealable pressure vessel having a volume of 1 liter. First, 60.0 g of a polyolefin resin (A) (BONDINE HX-8210 available from Sumitomo Chemical Co., Ltd.) according to the present invention, 30.0 g of ethylene glycol n-butyl ether (hereinafter referred to as "Bu-EG") as an organic solvent, 3.9 g of N,N-dimethylethanolamine (hereinafter referred to as "DMEA") as a basic compound and 206.1 g of distilled water were fed in the glass vessel. A DMEA amount of 3.9 g corresponds to 1.2 equivalents based on carboxyl groups of maleic anhydride in the resin, and a BU-EG amount of 30.0 g corresponds to 10 wt %.

Subsequently, the resulting mixture was stirred with a stirrer blades rotated at a rotation speed of 300 rpm. Then, sedimentation of resin particles was not observed in the bottom of the vessel, but the resin particles were floated. While this state was maintained, the heater was turned on to heat the mixture after a lapse of ten minutes. Then, the system temperature was kept at 140° C., and the mixture was further stirred for 20 minutes. In turn, the vessel was immersed in a water bath to cool the mixture to a room temperature (about 25° C.), while the mixture was stirred at a rotation speed of 300 rpm. Thereafter, the mixture was filtered through a 300-mesh stainless filter (plane weave having a filament diameter of 0.035 mm) under pressure (at an air pressure of 0.2 MPa). Thus, a milky-white homogeneous aqueous polyolefin resin dispersion E-1 was obtained. The residual ester group ratio was 100%. Even after the aqueous dispersion was allowed to stand at a room temperature for 90 days, the residual ester group ratio was unchanged at 100%.

The properties of the aqueous dispersion thus obtained and the like are shown in Table 2.

TABLE 2

| | Example | | | | | | |
|---|---|---|---|---|---|---|---|
| | 1 | 2 | 3 | 4 | 5 | 6 | 7 |
| Aqueous dispersion Formulation | E-1 | E-2 | E-3 | E-4 | E-5 | E-6 | E-7 |
| Polyolefin resin | (A) | (A) | (A) | (A) | (A) | (A) | (A) |
| Basic compound (equivalent/COOH) | | | | | | | |
| DMEA | 1.2 | 0.8 | — | — | — | 1.2 | — |
| TEA | — | — | 1.2 | 1.2 | 1.2 | — | — |
| NH$_3$ | — | — | — | — | — | — | 1.2 |
| Organic solvent (wt %) | | | | | | | |
| Bu—EG | 10 | 10 | 10 | — | — | 7 | 10 |
| IPA | — | — | — | 20 | — | — | — |
| Et—OH | — | — | — | — | 25 | — | — |
| Solid concentration (wt %) | 20.0 | 20.0 | 20.0 | 20.0 | 20.0 | 20.0 | 20.0 |
| Water compatibilization ratio (%) | 100 | 100 | 100 | 100 | 100 | 83 | 95 |
| Properties of dispersion | | | | | | | |
| Appearance | Milky white | Milky white | Milky white | Milky white | Milky white | Milky white | Milky white |
| Solid concentration (wt %) | 20.1 | 19.8 | 20.0 | 20.0 | 20.1 | 16.5 | 19.2 |
| Viscosity (mPa · S) | 30 | 40 | 20 | 20 | 20 | 30 | 40 |
| Particle diameter (μm) mn | 0.060 | 0.065 | 0.066 | 0.055 | 0.064 | 0.083 | 0.085 |
| mw | 0.088 | 0.096 | 0.090 | 0.074 | 0.089 | 0.114 | 0.122 |
| Particle dispersion degree mw/mn | 1.5 | 1.5 | 1.4 | 1.3 | 1.4 | 1.4 | 1.4 |
| Pot life | ○ | ○ | ○ | ○ | ○ | ○ | ○ |
| Water resistance | ○ | ○ | ○ | ○ | ○ | ○ | ○ |

TABLE 2-continued

| | | | | | | | |
|---|---|---|---|---|---|---|---|
| MFR (g/10 min) after water compatibilization | 200 | 200 | 205 | 200 | 200 | 200 | 200 |
| Residual Ester group ratio (%) | 100 | 100 | 100 | 98 | 99 | 99 | 100 |
| Haze (%) of coated film | 2.8 | 2.8 | 2.8 | 2.8 | 2.8 | 2.8 | 2.8 |

| | Example | | | | | |
|---|---|---|---|---|---|---|
| | 8 | 9 | 10 | 11 | 12 | 13 |
| Aqueous dispersion Formulation | E-8 | E-9 | E-10 | E-11 | E-12 | E-13 |
| Polyolefin resin | (A) | (B) | (B) | (C) | (C) | (C) |
| Basic compound (equivalent/COOH) | | | | | | |
| DMEA | 1.2 | 1.5 | — | — | — | — |
| TEA | — | — | 1.5 | 1.2 | 1.2 | 1.5 |
| NH$_3$ | — | — | — | — | — | — |
| Organic solvent (wt %) | | | | | | |
| Bu—EG | 10 | 10 | — | — | 15 | — |
| IPA | — | — | 18 | 28 | — | 28 |
| Et—OH | — | — | — | — | — | — |
| Solid concentration (wt %) | 30.0 | 20.0 | 20.0 | 20.0 | 20.0 | 20.0 |
| Water compatibilization ratio (%) | 100 | 100 | 100 | 100 | 100 | 100 |
| Properties of dispersion | | | | | | |
| Appearance | Milky white | Milky white | Milky white | Milky white | Milky white | Milky white |
| Solid concentration (wt %) | 30.1 | 19.9 | 20.0 | 20.0 | 20.0 | 20.0 |
| Viscosity (mPa · S) | 1000 | 20 | 20 | 300 | 500 | 100 |
| Particle diameter (μm) mn | 0.062 | 0.068 | 0.074 | 0.093 | 0.089 | 0.063 |
| mw | 0.080 | 0.089 | 0.092 | 0.158 | 0.144 | 0.092 |
| Particle dispersion degree mw/mn | 1.3 | 1.3 | 1.2 | 1.7 | 1.6 | 1.5 |
| Pot life | ○ | ○ | ○ | ○ | ○ | ○ |
| Water resistance | ○ | ○ | ○ | ○ | ○ | ○ |
| MFR (g/10 min) after water compatibilization | 200 | 65 | 65 | 3 | 3 | 5 |
| Ester group residue ratio (%) | 99 | 100 | 100 | 100 | 100 | 95 |
| Haze (%) of coated film | 2.8 | 2.6 | 2.6 | 2.8 | 2.8 | 2.8 |

Example 2

An aqueous polyolefin resin dispersion E-2 was prepared in substantially the same manner as in Example 1, except that the amount of the basic compound was 0.8 equivalents based on the carboxyl groups of maleic anhydride in the resin.

The properties of the aqueous dispersion thus obtained and the like are shown in Table 2.

Example 3

An aqueous polyolefin resin dispersion E-3 was prepared in substantially the same manner as in Example 1, except that triethylamine (hereinafter referred to as "TEA") was used as the basic compound.

The properties of the aqueous dispersion thus obtained and the like are shown in Table 2.

Example 4

An aqueous polyolefin resin dispersion E-4 was prepared in substantially the same manner as in Example 1, except that TEA was used as the basic compound and isopropanol (hereinafter referred to as "IPA") was used as the organic solvent in an amount of 20 wt %. After the water compatibilization, the residual ester group ratio of the resin was 98% with 2% of ethyl acrylate hydrolyzed. Even after the aqueous dispersion was allowed to stand at a room temperature for 90 days, the residual ester group ratio was unchanged at 98%.

The properties of the aqueous dispersion thus obtained and the like are shown in Table 2.

Example 5

An aqueous polyolefin resin dispersion E-5 was prepared in substantially the same manner as in Example 1, except that TEA was used as the basic compound and ethanol (hereinafter referred to as "EtOH") was used as the organic solvent in an amount of 25 wt %. After the water compatibilization, the residual ester group ratio of the resin was 99% with 1% of ethyl acrylate hydrolyzed. Even after the aqueous dispersion was allowed to stand at a room temperature for 90 days, the residual ester group ratio was unchanged at 99%.

The properties of the aqueous dispersion thus obtained and the like are shown in Table 2.

Example 6

An aqueous polyolefin resin dispersion E-6 was prepared in substantially the same manner as in Example 1, except that the amount of the organic solvent was 7 wt %. The water compatibilization ratio was 83%. After the water compatibilization, the residual ester group ratio of the resin was 99% with 1% of ethyl acrylate hydrolyzed. Even after the aqueous dispersion was allowed to stand at a room temperature for 90 days, the residual ester group ratio was unchanged at 99%.

The properties of the aqueous dispersion thus obtained and the like are shown in Table 2.

Example 7

An aqueous polyolefin resin dispersion E-7 was prepared in substantially the same manner as in Example 1, except that ammonia (25% aqueous $NH_3$) was used as the basic compound. The water compatibilization ratio was 95%.

The properties of the aqueous dispersion thus obtained and the like are shown in Table 2.

Example 8

An aqueous polyolefin resin dispersion E-8 was prepared in substantially the same manner as in Example 1, except that the solid concentration of the fed polyolefin resin was 30 wt %. After the water compatibilization, the residual ester group ratio of the resin was 99% with 1% of ethyl acrylate hydrolyzed. Even after the aqueous dispersion was allowed to stand at a room temperature for 90 days, the residual ester group ratio was unchanged at 99%.

The properties of the aqueous dispersion thus obtained and the like are shown in Table 2.

Example 9

An aqueous polyolefin resin dispersion E-9 was prepared in substantially the same manner as in Example 1, except that a polyolefin resin (B) (BONDINE HX-8290 available from Sumitomo Chemical Co., Ltd.) according to the present invention was used as the polyolefin resin and the amount of the basic compound was 1.5 equivalents based on the carboxyl groups of maleic anhydride in the resin.

The properties of the aqueous dispersion thus obtained and the like are shown in Table 2.

Example 10

An aqueous polyolefin resin dispersion E-10 was prepared in substantially the same manner as in Example 1, except that a polyolefin resin (B) (BONDINE HX-8290 available from Sumitomo Chemical Co., Ltd.) according to the present invention was used as the polyolefin resin, TEA was used as the basic compound in an amount of 1.5 equivalents based on the carboxyl groups of maleic anhydride in the resin, and IPA was used as the organic solvent in an amount of 18 wt %.

The properties of the aqueous dispersion thus obtained and the like are shown in Table 2.

Example 11

An aqueous polyolefin resin dispersion E-11 was prepared in substantially the same manner as in Example 1, except that a polyolefin resin (C) (BONDINE TX-8030 available from Sumitomo Chemical Co., Ltd.) according to the present invention was used as the polyolefin resin, TEA was used as the basic compound, and IPA was used as the organic solvent in an amount of 28 wt %.

The properties of the aqueous dispersion thus obtained and the like are shown in Table 2.

Example 12

An aqueous polyolefin resin dispersion E-12 was prepared in substantially the same manner as in Example 1, except that a polyolefin resin (C) (BONDINE TX-8030 available from Sumitomo Chemical Co., Ltd.) according to the present invention was used as the polyolefin resin, TEA was used as the basic compound, and the amount of the organic solvent was 15 wt %.

The properties of the aqueous dispersion thus obtained and the like are shown in Table 2.

Example 13

An aqueous polyolefin resin dispersion E-13 was prepared in substantially the same manner as in Example 1, except that a polyolefin resin (D) (BONDINE LX-4110 available from Sumitomo Chemical Co., Ltd.) according to the present invention was used as the polyolefin resin, TEA was used as the basic compound in an amount of 1.5 equivalents based on the carboxyl groups of maleic anhydride in the resin, and IPA was used as the organic solvent in an amount of 28 wt %. After the water compatibilization, the residual ester group ratio of the resin was 95% with 5% of ethyl acrylate hydrolyzed. Even after the aqueous dispersion was allowed to stand at a room temperature for 90 days, the residual ester group ratio was unchanged at 95%.

The properties of the aqueous dispersion thus obtained and the like are shown in Table 2.

In Examples 1 to 13, the polyolefin resins according to the present invention were employed, so that the polyolefin resins in the aqueous dispersions each had a number average particle diameter and a weight average particle diameter of not greater than 1 $\mu$m and a single-peak particle size distribution. Therefore, the aqueous dispersions each having an excellent dispersibility were provided virtually without the addition of the nonvolatile water-compatibilizing agent. In Examples 1 to 8, the MFR of the resin was 200 g/10 minutes after the water compatibilization without reduction in the molecular weight of the resin. In Examples 9 to 13, the MFR of the resin was unchanged after the water compatibilization. Further, coated films produced by applying the respective aqueous polyolefin resin dispersions on base films were excellent in water resistance and transparency.

Comparative Example 1

A polyolefin resin having a different composition from the inventive polyolefin resin, i.e., a polyolefin resin. (E) (ESCOL TR-5-100 available from Exxon Chemical Company) was employed which did not contain the specific compound and contained the unsaturated carboxylic acid in a proportion greater than the range specified in the present invention. An attempt was made to prepare an aqueous polyolefin resin dispersion in substantially the same manner as in Example 1 except for the aforesaid point. However, coarse particles were visually observed even after the resulting mixture was stirred at 140° C. for 20 minutes. After the system temperature was raised to 160° C., the mixture was further stirred for 20 minutes. However, the coarse particles were still visually observed. Subsequently, the mixture was cooled to a room temperature, and filtered through a 300-mesh stainless filter (plane weave having a filament diameter of 0.035 mm) under pressure (at an air pressure of 0.2 MPa). A great amount of the resin was present on the filter. Therefore, the water compatibilization of the resin was virtually failed.

The proportions of the fed ingredients and the like are shown in Table 3.

TABLE 3

|  | Comparative Example | | | | | |
| --- | --- | --- | --- | --- | --- | --- |
|  | 1 | 2 | 3 | 4 | 5 | 6 |
| Aqueous dispersion Formulation | — | — | H-3 | — | — | — |
| Polyolefin resin | (E) | (F) | (A) | (A) | (B) | (A) |
| Basic compound (equivalent/COOH) | | | | | | |
| DMEA | 1.2 | — | — | 1.2 | 1.5 | — |
| TEA | — | 1.2 | 1.2 | — | — | — |
| NH$_3$ | — | — | — | — | — | — |
| Organic solvent (wt %) | | | | | | |
| Bu—EG | 10 | — | — | — | — | 10 |
| IPA | — | 28 | — | — | — | — |
| Solid concentration (wt %) | 20.0 | 20.0 | 22.0 | 20.0 | 20.0 | 20.0 |
| Water compatibilization ratio (%) | 5 | 20 | ※ | <1 | <1 | 3 |
| Properties of dispersion | | | | | | |
| Appearance | No aqueous dispersion was obtained | | Milky white | No aqueous dispersion was obtained | | |
| Solid concentration (wt %) | | | 19.0 | | | |
| Viscosity (mPa · S) | | | 30 | | | |
| Particle diameter (μm)   mn | | | 1.9 | | | |
|                          mw | | | 3.6 | | | |
| Particle dispersion degree mw/mn | | | 1.9 | | | |
| Pot life | | | X (3 days) | | | |
| Water resistance | | | X | | | |
| MFR (g/10 min) after water compatibilization | | | 210 | | | |
| Ester group residue ratio (%) | | | 100 | | | |
| Haze (%) of coated film | | | 99.2 | | | |

※ Measurement was impossible due to clogging of filter.

Comparative Example 2

A polyolefin resin having a different composition from the inventive polyolefin resin, i.e., a polyolefin resin (F) (available from Aldrich Company) was employed which did not contain the specific compound. This polyolefin resin (F) was a poly(ethylene-maleic anhydride), which contained 3 wt % of maleic anhydride and had a viscosity of 1700 to 4500 (mPa·s) at 140° C. TEA was used as a basic compound, and IPA was used as an organic solvent in an amount of 28 wt %. An attempt was made to prepare an aqueous polyolefin resin dispersion in substantially the same manner as in Example 1 except for the aforesaid points. However, coarse particles were visually observed even after the resulting mixture was stirred at 140° C. for 20 minutes. After the system temperature was raised to 160° C., the mixture was further stirred for 20 minutes. However, the coarse particles were still visually observed. Subsequently, the mixture was cooled to a room temperature, and filtered through a 300-mesh stainless filter (plane weave having a filament diameter of 0.035 mm) under pressure (at an air pressure of 0.2 MPa). A great amount of the resin was present on the filter. Therefore, the water compatibilization of the resin was virtually failed.

The proportions of the fed ingredients and the like are shown in Table 3.

Comparative Example 3

First, 60.0 g of a polyolefin resin (A) (BONDINE HX-8210 available from Sumitomo Chemical Co., Ltd.), 4.5 g of TEA (1.2 equivalents based on carboxyl groups of maleic anhydride in the resin)) as a basic compound, 6.0 g of polyoxyethylene polyoxypropylene glycol as an emulsifying agent and 229.5 g of distilled water were fed in a glass vessel, and then the resulting mixture was stirred in the same manner as in Example 1. No organic solvent was added to the mixture. The solid concentration of the mixture of the fed ingredients was 22.0%. After the mixture was cooled to a room temperature, and an attempt is made to filter the mixture through a 300-mesh stainless filter (plane weave having a filament diameter of 0.035 mm) under pressure (at an air pressure of 0.2 MPa). However, the filter was clogged. An unfiltered milky-white aqueous polyolefin resin dispersion was designated as H-3.

The properties of the aqueous dispersion thus obtained and the like are shown in Table 3.

Although the aqueous dispersion according to the present invention was obtained in Comparative Example 3, it was necessary to employ the emulsifying agent because no organic solvent was used in the preparation. The aqueous dispersion had slightly inferior properties.

Comparative Example 4

An attempt was made to prepare an aqueous polyolefin resin dispersion in substantially the same manner as in Example 1 without the addition of the organic solvent. However, coarse particles were visually observed even after the resulting mixture was stirred at 140° C. for 20 minutes. After the system temperature was raised to 160° C., the mixture was further stirred for 20 minutes. However, the coarse particles were still visually observed. Subsequently, the mixture was cooled to a room temperature, and filtered through a 300-mesh stainless filter (plane weave having a filament diameter of 0.035 mm) under pressure (at an air pressure of 0.2 MPa). A great amount of the resin was present on the filter. Therefore, the water compatibilization of the resin was virtually failed.

The proportions of the fed ingredients and the like are shown in Table 3.

Comparative Example 5

An attempt was made to prepare an aqueous polyolefin resin dispersion in substantially the same manner as in Example 1, except that a polyolefin resin (B) (BONDINE HX-8290 available from Sumitomo Chemical Co., Ltd.) was employed, the proportion of the basic compound was 1.5 equivalents, and no organic solvent was added. However, coarse particles were visually observed even after the resulting mixture was stirred at 140° C. for 20 minutes. After the system temperature was raised to 160° C., the mixture was further stirred for 20 minutes. However, the coarse particles were still visually observed. Subsequently, the mixture was cooled to a room temperature, and filtered through a 300-mesh stainless filter (plane weave having a filament diameter of 0.035 mm) under pressure (at an air pressure of 0.2 MPa). A great amount of the resin was present on the filter. Therefore, the water compatibilization of the resin was virtually failed.

The proportions of the fed ingredients and the like are shown in Table 3.

Comparative Example 6

An attempt was made to prepare an aqueous polyolefin resin dispersion in substantially the same manner as in Example 1 without the addition of the basic compound. However, coarse particles were visually observed even after the resulting mixture was stirred at 140° C. for 20 minutes. After the system temperature was raised to; 160° C., the mixture was further stirred for 20 minutes. However, the coarse particles were still visually observed. Subsequently, the mixture was cooled to a room temperature, and filtered through a 300-mesh stainless filter (plane weave having a filament diameter of 0.035 mm) under pressure (at an air pressure of 0.2 MPa). A great amount of the resin was present on the filter. Therefore, the water compatibilization of the resin was virtually failed.

The proportions of the fed ingredients and the like are shown in Table 3.

Example 14

The aqueous polyolefin resin dispersion E-1 prepared in Example 1 was mixed with an aqueous polyurethane dispersion (ADECABON-TITER HUX-380 available from Asahi Denka Kogyo Co., Ltd.) as an additional aqueous polymer dispersion. The aqueous dispersion E-1 was first stirred, and then the additional aqueous dispersion was added to the aqueous dispersion E-1 in an amount of 50 parts by weight on a solid basis with respect to 100 parts by weight of the solid component of the aqueous dispersion E-1. The resulting mixture was stirred at a room temperature for 30 minutes. The mixture was designated as M-1.

The blend stability of the mixture thus obtained is shown in Table 4.

TABLE 4

| | Aqueous dispersion | Blended substance Type | Added amount* (Parts by weight) | Mixture | Blend stability |
|---|---|---|---|---|---|
| Example 14 | E-1 | Additional aqueous dispersion HUX-380 | 50 | M-1 | 10 days Higher viscosity |
| Example 15 | E-10 | Cross-linking agent CYMEL 327 | 5 | M-2 | No change after lapse of 60 days |
| Example 16 | E-10 | Cross-linking agent DENACOL EX-313 | 10 | M-3 | 10 days Higher viscosity |
| Example 17 | E-10 | Cross-linking agent DENACOL EX-1310 | 10 | M-4 | No change after lapse of 60 days |
| Example 18 | E-10 | Cross-linking agent EPOCROSS WS-700 | 30 | M-5 | No change after lapse of 60 days |
| Example 19 | E-10 | Cross-linking agent CARBODILITE E-02 | 50 | M-6 | No change after lapse of 60 days |
| Example 20 | E-1 | Layered inorganic compound KUNIPIA F | 10 | M-7 | No change after lapse of 60 days |
| Example 21 | E-1 | Magnesium oxide | 10 | M-8 | No change after lapse of 60 days |
| Example 22 | E-1 | Sodium chloride | 30 mol % | M-9 | No change after lapse of 60 days |
| Comparative Example 7 | S-1 | Additional aqueous dispersion HUX-380 | 50 | — | 3 days Solidification |
| Comparative Example 8 | S-1 | Cross-linking agent DENACOL EX-313 | 10 | — | 1 day Solidification |
| Comparative | S-1 | Cross-linking | 10 | — | 2 days |

Examples 15 to 19

Various cross-linking agents were each mixed with the aqueous polyolefin resin dispersion E-10 prepared in Example 10. The aqueous dispersion E-10 was first stirred, and the cross-linking agent was added to the aqueous dispersion E-10. Then, the resulting mixture was stirred at a room temperature for 30 minutes. The amount of the added cross-linking agent was represented on a solid basis with respect to 100 parts by weight of the solid component of the aqueous dispersion E-10. More specifically, 5 parts by weight of a melamine compound (CYMEL 327 available from Mitsui Cytec, Ltd.) was employed in Example 15. In Example 16, 10 parts by weight of an epoxy compound (DENACOL EX-313 available from Nagase Chemicals, Ltd.) was employed. In Example 17, 10 parts by weight of an epoxy compound (DENACOL EX-1310 available from Nagase Chemicals, Ltd.) was employed. In Example 18, 30 parts by weight of an oxazoline group containing compound (EPOCROSS WS-700 available from Nihon Catalyst Co., Ltd.) was employed. In Example 19, 50 parts by weight of a carbodiimide compound (CARBODILITE E-02 available from Nisshinbo Industries, Inc.) was employed. The resulting mixtures were respectively designated as M-1 to M-6.

The blend stabilities of the respective mixtures are shown in Table 4.

Example 20

The aqueous dispersion E-1 prepared in Example 1 was mixed with 10 parts by weight of a layered inorganic compound (KUNIPIA F available from Kunimine Kogyo Co., Ltd.) and 250 parts by weight of glass beads based on 100 parts by weight of the solid component of the aqueous dispersion E-1, and the resulting mixture was shaken for 1 hour by means of a paint shaker. Then, the glass beads were removed from the mixture. The resulting mixture was designated as M-7.

The blend stability of the mixture thus obtained is shown in Table 4.

Example 21

A mixture was prepared in substantially the same manner as in Example 20, except that magnesium oxide (available from Wako Pure Chemical Industries, Ltd.) having a particle diameter of 0.01 μm was employed instead of the layered inorganic compound. The mixture was designated as M-8.

The blend stability of the mixture thus obtained is shown in Table 4.

Example 22

Sodium chloride was added to the aqueous dispersion E-1 prepared in Example 1 in an amount of 30 mol % based on the amount of carboxyl groups in the polyolefin resin, and then the resulting mixture was stirred at a room temperature for 30 minutes. The mixture was designated as M-9.

The blend stability of the mixture thus obtained is shown in Table 4.

The mixture of Example 14 was unchanged for 10 days with excellent blend stability with respect to the additional aqueous polymer dispersion, because the aqueous polyolefin resin dispersion according to the present invention was employed. After a lapse of 10 days, the mixture had an increased viscosity, which was not problematic in practice. The mixtures of Examples 15 to 22 were unchanged even after a lapse of 60 days with excellent blend stabilities with respect to the cross-linking agents and the inorganic compounds, because the aqueous polyolefin resin dispersion according to the present invention was employed.

Comparative Example 7

An aqueous polyolefin resin dispersion was prepared by employing a stirrer having a glass vessel with a heater. The glass vessel was a sealable pressure vessel having a volume of 1 liter. First, 60.0 g of a polyolefin resin (G) (PRIMACOL 5980 I, a copolymer with 20 wt % of acrylic acid, available from Dow Chemical Company) having a different composition from the inventive polyolefin resin, 17.7 g of TEA as a basic compound and 222.3 g of distilled water were fed in the glass vessel. A TEA amount of 17.7 corresponds to 1.05 equivalents based on carboxyl groups of maleic anhydride in the resin.

Subsequently, the resulting mixture was stirred with a stirrer blades rotated at a rotation speed of 300 rpm. Then, sedimentation of resin particles was not observed in the bottom of the vessel, but the resin particles were floated. While this state was maintained, the heater was turned on to heat the mixture after a lapse of 10 minutes. Then, the system temperature was kept at 100 to 105° C., and the mixture was further stirred for 20 minutes. In turn, the vessel was immersed in a water bath to cool the mixture to a room temperature (about 25° C.), while the mixture was stirred at a rotation speed of 300 rpm. Thereafter, the mixture was filtered through a 300-mesh stainless filter (plane weave having a filament diameter of 0.035 mm) under pressure (at an air pressure of 0.2 MPa). A slightly white aqueous dispersion thus obtained was designated as S-1. Almost no resin remained on the filter.

The aqueous dispersion S-1 was mixed with the aqueous polyurethane dispersion (ADEKABON-TITER HUX-380 available from Asahi Denka Kogyo K.K.) employed in Example 14. First, the aqueous dispersion E-1 was stirred, and the aqueous polyurethane dispersion was added to the aqueous dispersion S-1 in an amount of 50 parts by weight on a solid basis with respect to 100 parts by weight of the solid component of the aqueous dispersion S-1. Then, the resulting mixture was stirred at a room temperature for 30 minutes.

The blend stability of the mixture thus obtained is shown in Table 4.

Comparative Examples 8 and 9

The cross-linking agents employed in Examples 16, 17 were each mixed with the aqueous dispersion S-1 prepared in Comparative Example 7. First, the aqueous dispersion S-1 was stirred, and the cross-linking agent was added to the aqueous dispersion S-1 in an amount of 10 parts by weight on a solid basis with respect to 100 parts by weight of the solid component of the aqueous dispersion S-1. Then, the resulting mixture was stirred at a room temperature for 30 minutes. As the cross-linking agents, an epoxy compound (DENACOL EX-3-13 available from Nagase Chemicals, Ltd.) was employed in Comparative Example 8, and an epoxy compound (DENACOL EX-1310 available from Nagase Chemicals, Ltd.) was employed in Comparative Example 9.

The blend stabilities of the respective mixtures are shown in Table 4.

In Comparative Examples 7 to 9, the aqueous dispersion was prepared by employing the polyolefin resin falling outside the scope of the present invention, so that the blend stabilities with respect to the additional aqueous dispersion and the cross-linking agents were inferior.

Example 23

First, 250 g of the aqueous polyolefin resin dispersion E-10 prepared in Example 10 and 85 g of distilled water were fed in a two-neck round-bottom flask having a volume of 1 L. Then, a mechanical stirrer and a Liebig's condenser were attached to the flask, and the flask was heated in an oil bath for evaporation of the aqueous medium. When about 90 g of the aqueous medium was evaporated away, the heating was finished, and the flask was cooled to a room temperature. After the resulting mixture was cooled to a room temperature, a liquid component in the flask was filtered through a 300-mesh stainless filter (plane weave having a filament diameter of 0.035 mm) under pressure (at an air pressure of 0.2 MPa). The solid concentration of the resulting filtrate was 20.5 wt %. Distilled water was added to the filtrate with stirring for adjusting the solid concentration to 20.0 wt %. The resulting aqueous dispersion was designated as E-10S.

The content of the organic solvent (IPA) in the aqueous dispersion E-10S was 0.4 wt %. When the appearance of the aqueous dispersion was visually observed, the aqueous dispersion was homogeneous without sedimentation and phase separation. The number average particle diameter and the weight average particle diameter were 0.070 $\mu$m and 0.092 $\mu$m, respectively, and the particle size distribution had a single peak. Even after the aqueous dispersion was allowed to stand for 90 days, the appearance was unchanged and stable. The aqueous dispersion was applied on a 12-$\mu$m thick biaxially stretched PET film (EMBLET PET12 available from Unitika, Ltd.) by means of a Myer bar so as to provide a dried coating thickness of about 1 $\mu$m, and dried at 200° C. for two minutes.

The resulting coated film was excellent in water resistance and transparency with a haze of 3.2%. Thus, the aqueous dispersion from which the organic solvent was removed also provided advantageous results.

Example 24

First, 250 g of the aqueous polyolefin resin dispersion E-11 prepared in Example 11 and 100 g of distilled water were fed in a two-neck round-bottom flask having a volume of 1 L. Then, a mechanical stirrer and a Liebig's condenser were attached to the flask, and the flask was heated in an oil bath for evaporation of the aqueous medium. When about 105 g of the aqueous medium was evaporated away, the heating was finished, and the flask was cooled to a room temperature. After the resulting mixture was cooled to a room temperature, a liquid component in the flask was filtered through a 300-mesh stainless filter (plane weave having a filament diameter of 0.035 mm) under pressure (at an air pressure of 0.2 MPa). The solid concentration of the resulting filtrate was 20.4 wt %. Distilled water was added to the filtrate with stirring for adjusting the solid concentration to 20.0 wt %. The resulting aqueous dispersion was designated as E-11S.

The content of the organic solvent (IPA) in the aqueous dispersion E-11S was 1.0 wt %. When the appearance of the aqueous dispersion was visually observed, the aqueous dispersion was homogeneous without sedimentation and phase separation. The number average particle diameter and the weight average particle diameter were 0.094 $\mu$m and 0.148 $\mu$m, respectively, and the particle size distribution had a single peak. Even after the aqueous dispersion was allowed to stand for 90 days, the appearance was unchanged and stable. The aqueous dispersion was applied on a 12-$\mu$m thick biaxially stretched PET film (EMBLET PET12 available from Unitika, Ltd.) by means of a Myer bar so as to provide a dried coating thickness of about 1 $\mu$m, and dried at 200° C. for two minutes.

The resulting coated film was excellent in water resistance and transparency with a haze of 3.3%. Thus; the aqueous dispersion from which the organic solvent was removed also provided advantageous results.

The aqueous polyolefin resin dispersions prepared in Examples 1, 9 and 14 to 22 were each employed as a coating agent. A 120-$\mu$m thick unstretched PET film and a 150-$\mu$m thick Ny6 film were each employed as a base film. The aqueous polyolefin resin dispersions were each applied on the base film by means of a Myer bar so as to provide a dried coating thickness of 2 $\mu$m, and dried at 100° C. for one minute. After the resulting coated film was allowed to stand at a room temperature for one day, the adhesion was evaluated by the aforesaid cross-cut tape peeling method.

The measurement results are shown in Table 5.

TABLE 5

| Aqueous polyolefin | Evaluation of adhesion | |
|---|---|---|
| resin dispersion | PET | Nylon 6 |
| E-1 (Example 1) | 100/100 | 100/100 |
| E-9 (Example 9) | 100/100 | 100/100 |
| M-1 (Example 14) | 100/100 | 100/100 |
| M-2 (Example 15) | 100/100 | 100/100 |
| M-3 (Example 16) | 100/100 | 100/100 |
| M-4 (Example 17) | 100/100 | 100/100 |
| M-5 (Example 18) | 100/100 | 100/100 |
| M-6 (Example 19) | 100/100 | 100/100 |
| M-7 (Example 20) | 100/100 | 100/100 |
| M-8 (Example 21) | 100/100 | 100/100 |
| M-9 (Example 22) | 100/100 | 100/100 |

As shown in Table 5, the coated films thus obtained were excellent in adhesion with respect to the base film irrespective of the type of the base film, because the aqueous polyolefin resin dispersions according to the present invention were each employed as the coating agent.

Example 25

The water resistance, the alkali resistance, the adhesion and the heat-seal strength were determined by employing the aqueous polyolefin resin dispersion E-10 prepared in Example 10 as a coating agent and various types of base films.

First, a 12-$\mu$m thick biaxially stretched PET film (EMBLET PET12 available from Unitika, Ltd.) was employed as a base film. The aqueous dispersion E-10 was applied on this base film by means of a Myer bar so as to provide a dried coating thickness of about 1 $\mu$m, and dried at 200° C. for two minutes. The water resistance of the resulting coated film was evaluated.

A 12-$\mu$m thick biaxially stretched PET film (EMBLET PET12 available from Unitika, Ltd.) and a 20-$\mu$m thick stretched PP film (available from Tocello Company) were each employed as a base film. A surface of the base film to be coated with the coating agent was corona-treated. The aqueous dispersion E-10 was applied on the corona-treated surface by means of a Myer bar so as to provide a dried coating thickness of 2 $\mu$m, and dried at 100° C. for one minute. After the resulting coated film was allowed to stand at a room temperature for one day, the alkali resistance was evaluated.

A 120-$\mu$m thick unstretched PET film and a 150-$\mu$m thick Ny6 film were each employed as a base film. The aqueous dispersion E-10 was applied on the base film by means of a Myer bar so as to provide a dried coating thickness of 2 $\mu$m, and dried at 100° C. for one minute. After the resulting coated film was allowed to stand at a room temperature for one day, the adhesion was evaluated by the aforesaid cross-cut tape peeling method.

A 12-μm thick biaxially stretched PET film (EMBLET PET12 available from Unitika, Ltd.), a 15-μm thick biaxially stretched Ny6 film (EMBLEM available from Unitika, Ltd.) and a 20-μm thick stretched PP film (available from TOCELLO Company) were each employed as a base film. The aqueous dispersion E-10 was applied on a surface of the base film corona-treated or not corona-treated by means of a Myer bar so as to provide a dried coating thickness of 2 μm, and dried at 100° C. for one minute. Thus, a coated film was produced. By employing this coated film, the heat-seal strength was measured.

The measurement results are shown in Table 6.

TABLE 6

|  |  |  | Example | | | | comparative |
|---|---|---|---|---|---|---|---|
|  |  |  | 25 | 26 | 27 | 28 | Example 10 |
| Aqueous dispersion | | | E-10 | E-4 | E-11 | E-10S | S-1 |
| Water resistance | | | ○ | ○ | ○ | ○ | ○ |
| Alkali resistance | | | | | | | |
| PET | | | ○ | ○ | ○ | ○ | X |
| PP | | | ○ | ○ | ○ | ○ | X |
| Adhesion | | | | | | | |
| PET | | | 100/100 | 100/100 | 100/100 | 100/100 | 100/100 |
| Ny6 | | | 100/100 | 100/100 | 100/100 | 100/100 | 100/100 |
| Heat-seal strength (N/15 mm) | | | | | | | |
| PET | Corona-treated | 100° C. | 3.2 | 2.0 | 2.2 | 3.1 | 0.15 |
|  |  | 120° C. | 3.3 | 2.1 | 2.4 | 3.4 | 0.15 |
|  | Not corona-treated | 100° C. | 2.9 | 2.3 | 2.1 | 3.2 | 0.10 |
|  |  | 120° C. | 3.2 | 2.3 | 2.4 | 3.9 | 0.15 |
| Ny6 | Corona-treated | 100° C. | 4.3 | 3.4 | 3.9 | 4.2 | 0.25 |
|  |  | 120° C. | 4.0 | 3.6 | 3.9 | 4.1 | 0.29 |
|  | Not corona-treated | 100° C. | 4.1 | 3.2 | 3.7 | 4.1 | 0.20 |
|  |  | 120° C. | 4.3 | 3.4 | 4.0 | 4.1 | 0.25 |
| PP | Corona-treated | 100° C. | 2.0 | 1.2 | 1.4 | 2.0 | 0.20 |
|  |  | 120° C. | 2.0 | 1.1 | 1.4 | 2.1 | 0.20 |
|  | Not corona-treated | 100° C. | 1.9 | 1.2 | 1.4 | 2.0 | 0.20 |
|  |  | 120° C. | 2.0 | 1.3 | 1.4 | 2.0 | 0.20 |

Examples 26 to 28

The respective properties were evaluated in substantially the same manner as in Example 25, except that different aqueous polyolefin resin dispersions as shown in Table 6 were employed.

The measurement results are shown in Table 6.

Since the aqueous polyolefin resin dispersions according to the present invention were employed as the coating agents in Examples 25 to 28, the water resistance, the alkali resistance, the adhesion and the heat-seal strength were excellent.

Comparative Example 10

The respective properties were evaluated in substantially the same manner as in Example 25, except that the aqueous dispersion S-1 prepared in Comparative Example 7 was employed as the aqueous dispersion.

The measurement results are shown in Table 6.

Since the aqueous polyolefin resin dispersion employed in Comparative Example 10 contained the unsaturated carboxylic acid in a proportion of 20 wt % which was higher than the range specified in the present invention, the resulting coated film was inferior in alkali resistance and heat-sealability.

Example 29

By means of a T-die extruder (with a single axis screw of light compression type having a diameter of 75 mm and an L/D ratio of 45), a PET resin was extruded into a sheet at a cylinder temperature of 260° C. and a T-die temperature of 280° C., and the sheet was rapidly cooled in contact with a cooling roll having a surface temperature adjusted at 10° C. Thus, an unstretched film having a thickness of 120 μm was obtained. Subsequently, the unstretched film was introduced to a gravure roll coater, and the aqueous polyolefin resin dispersion E-10 prepared in Example 10 was applied on the unstretched film to provide a dried coating thickness of 15 μm, and dried in a hot air drier at 80° C. for 45 seconds. Then, the resulting film was supplied to a simultaneous biaxial stretching machine of tenter type. After the film was preheated at 100° C. for two seconds, the film was stretched longitudinally 3 times and transversely 3.5 times at 95° C. The transverse relaxation ratio was 5%. The coated film thus obtained had a coating thickness of 1.4 μm.

By employing the coated film, the heat-seal strength was measured. As a result, the coated film had an excellent heat-sealability with a heat-seal strength of 2.3 N/15 mm. The coated film also had an excellent alkali resistance.

Example 30

A coated film was produced in substantially the same manner as in Example 29, except that a Ny6 resin was employed instead of the PET resin. The T-die temperature was 270° C., and the thickness of the unstretched film was 150 μm. The stretching temperature was 170° C.

By employing the coated film thus obtained, the heat-seal strength was measured. As a result, the coated film had an excellent heat-sealability with a heat-seal strength of 3.4 N/15 mm. The coated film also had an excellent alkali resistance.

Example 31

It was examined how the heat-seal strength was influenced by the thickness of a coating layer.

Biaxially stretched PET films (EMBLET PET12 available form Unitika, Ltd.) having a thickness of 12 μm were employed as base films, and the aqueous dispersion E-10 prepared in Example 10 was employed as an aqueous polyolefin resin dispersion. The aqueous dispersion was applied on surfaces of the base films corona-treated and surfaces of the base films not corona-treated by means of a Myer bar so as to provide dried coating thicknesses of 0.8 $\mu$m, 2 $\mu$m, 4 $\mu$m and 8 $\mu$m, and dried at 100° C. for two minutes.

The coated films thus obtained were laminated with coating layers thereof in contact with each other, and pressed at a press temperature of 120° C. at a sealing pressure of 0.3 MPa for two seconds by means of a heat press machine.

The laminate film obtained after the press was cut to a width of 15 mm, and allowed to stand for one day. Thereafter, the peal strength of the coating layers was measured at a pulling rate of 200 mm/minute at a pulling angle of 180 degrees by means of a tensile tester (INTESCO Precision Universal Material Tester Model 2020 available from Intesco Corporation). The peel strength was defined as the heat-seal strength.

The measurement results are shown in Table 7.

TABLE 7

|  |  | Example 31 | | | |
| --- | --- | --- | --- | --- | --- |
| Aqueous dispersion | | E-10 | | | |
| Base film | | PET | | | |
| Coating layer thickness ($\mu$m) | | 0.8 | 2 | 4 | 8 |
| Heat-seal strength | Corona-treated | 1.0 | 3.3 | 5.9 | 6.5 |
| (N/15 mm) | Not corona-treated | 1.1 | 3.3 | 5.9 | 6.9 |

As apparent from Table 7, the heat-seal strength was increased, as the thickness of the coating layer increased.

Example 32

A degreased steel plate melt-plated with zinc and having a size of 70 mm×150 mm×0.8 mm$^t$ (available from Nippon Test Panel Osaka Co.) was employed as a metal material. The aqueous dispersion E-4 prepared in Example 4 was applied on the metal material by a Myer bar, and dried at 200° C. for two minutes. Thus, a coated metal material was obtained. After the drying, the thickness of the coating film was 2 $\mu$m.

The properties of the coated metal material thus obtained and the like are shown in Table 8.

TABLE 8

| | Example | | | | | | |
| --- | --- | --- | --- | --- | --- | --- | --- |
| | 32 | 33 | 34 | 35 | 36 | 37 | 38 |
| Composition of coating agent | | | | | | | |
| Aqueous dispersion | E-4 | E-10 | E-11 | E-4 | E-4 | E-4 | E-4 |
| Additive | | | | | | | |
| Type | — | — | — | — | Colloidal silica | Silica | Silica |
| Added amount (parts by weight/resin) | — | — | — | — | 20 | 20 | 20 |
| Dried coating thickness ($\mu$m) | 2 | 2 | 2 | 2 | 2 | 2 | 1 |
| Conditions for heat treatment | 200° C. × 2 min | 200° C. × 2 min | 200° C. × 2 min | 100° C. × 2 min | 200° C. × 2 min | 200° C. × 2 min | 100° C. × 2 min |
| Properties of coated steel plate | | | | | | | |
| Corrosion resistance | ◯ | ◯ | ◯ | ◯ | ◯ | ⊙ | ⊙ |
| Alkali resistance | ◯ | ◯ | ◯ | ◯ | ◯ | ◯ | ◯ |
| Water resistance | ◯ | ◯ | ◯ | ◯ | ◯ | ◯ | ◯ |
| Solvent resistance | Δ–◯ | Δ–◯ | Δ–◯ | Δ–◯ | Δ–◯ | ◯ | ◯ |
| Workability | ◯ | ◯ | ◯ | ◯ | ◯ | ◯ | ◯ |
| Adhesion (I) | 100/100 | 100/100 | 100/100 | 100/100 | 100/100 | 100/100 | 100/100 |
| Adhesion (II) | ◯ | ◯ | ◯ | ◯ | ◯ | ◯ | ◯ |

| | Example | | | | | |
| --- | --- | --- | --- | --- | --- | --- |
| | 39 | 40 | 41 | 42 | 43 | 44 |
| Composition of coating agent | | | | | | |
| Aqueous dispersion | E-4 | E-4 | E-4 | E-4 | E-4 | E-4 |
| Additive | | | | | | |
| Type | KF | Aluminum phosphate | Calcium hydroxide | CYMEL 327 | EPOCROSS WS700 | DENACOL EX313 |
| Added amount (parts by weight/resin) | 20 | 40 | 30 mol %/ COOH | 10 | 10 | 5 |
| Dried coating thickness ($\mu$m) | 2 | 2 | 2 | 2 | 2 | 2 |
| Conditions for heat treatment | 200° C. × 2 min | 200° C. × 2 min | 200° C. × 2 min | 200° C. × 2 min | 200° C. × 2 min | 200° C. × 2 min |
| Properties of coated steel plate | | | | | | |
| Corrosion resistance | ⊙ | ⊙ | ⊙ | ⊙ | ⊙ | ⊙ |
| Alkali resistance | ◯ | ◯ | ◯ | ◯ | ◯ | ◯ |

TABLE 8-continued

| Water resistance | ○ | ○ | ○ | ○ | ○ | ○ |
| --- | --- | --- | --- | --- | --- | --- |
| Solvent resistance | ○ | ○ | ○ | ○ | ○ | ○ |
| Workability | ○ | ○ | ○ | ○ | ○ | ○ |
| Adhesion (I) | 100/100 | 100/100 | 100/100 | 100/100 | 100/100 | 100/100 |
| Adhesion (II) | ○ | ○ | ○ | ○ | ○ | ○ |

Examples 33 and 34

Coated metal materials were produced in substantially the same manner as in Example 32, except that the aqueous dispersion E-10 prepared in Example 10 and the aqueous dispersion E-11 prepared in Example 11 were each employed as the aqueous polyolefin resin dispersion.

The properties of the coated metal materials thus obtained and the like are shown in Table 8.

Example 35

A coated metal material was produced in substantially the same manner as in Example 32, except that the aqueous dispersion E-4 prepared in Example 4 was employed as the aqueous polyolefin resin dispersion and the heat treatment for the drying of the coating agent was carried out at 100° C. for two minutes.

The properties of the coated metal material thus obtained and the like are shown in Table 8.

Example 36

A coated metal material was produced in substantially the same manner as in Example 32, except that the coating agent was prepared by adding colloidal silica (SNOWTEX O available from Nissan Chemical Industries, Ltd.) having particle diameters of 0.01 to 0.02 μm to the aqueous dispersion E-4 in an amount of 20 parts by weight based on 100 parts by weight of the resin in the aqueous dispersion and stirring the resulting mixture.

The properties of the coated metal material thus obtained and the like are shown in Table 8.

Example 37

A coated metal material was produced in substantially the same manner as in Example 32, except that the coating agent was prepared by adding silica (AEROJIL 380 available from Nippon Aerojil Co., Ltd.) having particle diameters of about 0.007 μm to the aqueous dispersion E-4 in an amount of 20 parts by weight based on 100 parts by weight of the resin in the aqueous dispersion and stirring the resulting mixture.

The properties of the coated metal material thus obtained and the like are shown in Table 8.

Example 38

A coated metal material was produced in substantially the same manner as in Example 37, except that the dried coating thickness was 1 μm and the heat treatment was carried out at 100° C. for two minutes.

The properties of the coated metal material thus obtained and the like are shown in Table 8.

Example 39

A coating agent was prepared by adding a layered inorganic compound (KUNIPIA F, hereinafter referred to as "KF", available from Kunimine Kogyo Co., Ltd.) to the aqueous dispersion E-4 in an amount of 10 parts by weight based on 100 parts by weight of the resin in the aqueous dispersion, stirring the resulting mixture, and subjecting the mixture to a jet disintegrating process twice at 150 MPa by means of a microfluidizer (available from Mizuho Industry Co., Ltd). A coated metal material was produced in substantially the same manner as in Example 32 by employing the coating agent thus prepared.

The properties of the coated metal material thus obtained and the like are shown in Table 8.

Example 40

A coated metal material was produced by employing a coating agent prepared in substantially the same manner as in Example 39, except that aluminum phosphate (available from Ishizu Pharmaceutical Co., Ltd.) was added to the aqueous dispersion E-4 in an amount of 40 parts by weight based on 100 parts by weigh of the resin in the aqueous dispersion and the resulting mixture was stirred.

The properties of the coated metal material thus obtained and the like are shown in Table 8.

Example 41

A coated metal material was produced in substantially the same manner as in Example 32, except that a coating agent was prepared by adding calcium hydroxide (Wako Pure Chemical Industries, Ltd.) to the aqueous dispersion E-4 in an amount of 30 mol % based on the amount of carboxyl groups of the resin in the aqueous dispersion and stirring the resulting mixture.

The properties of the coated metal material thus obtained and the like are shown in Table 8.

Examples 42 to 44

Coating agents were each prepared by adding a cross-linking agent to the aqueous dispersion E-4 in a certain amount based on 100 parts by weight of the resin in the aqueous dispersion and stirring the resulting mixture. As for the types and amounts of the added cross-linking agents, 10 parts by weight of a melamine compound (CYMEL 327 available from Mitsui Cytec, Ltd.), 10 parts by weight of an oxazoline group containing compound (EPOCROSS WS-700 available from Nihon Catalyst Co., Ltd.) and 5 parts by weight of an epoxy compound (DENACOL EX-313 available from Nagase Chemicals, Ltd.) were employed in Examples 42, 43 and 44, respectively.

Coated metal materials were produced in the same manner as in Example 32 by employing these coating agents.

The properties of the coated metal materials thus obtained and the like are shown in Table 8.

Since the aqueous polyolefin resin dispersions according to the present invention were employed in Examples 32 to 35, the corrosion resistance, the alkali resistance, the water resistance, the solvent resistance, the workability and the adhesion to the base films were excellent. Particularly in Examples 36 to 44, the corrosion resistance was further improved because of the addition of the inorganic additives, calcium hydroxide and the cross-linking agents. In Example 38, the coating layer had excellent properties though having a smaller thickness.

Comparative Example 11

A coated metal material was produced in substantially the same manner as in Example 32, except that the aqueous dispersion S-1 prepared in Comparative Example 7 falling outside the scope of the present invention was employed as the aqueous polyolefin dispersion.

The properties of the coated metal material thus obtained and the like are shown in Table 9.

TABLE 9

| | Comparative Example | | |
|---|---|---|---|
| | 11 | 12 | 13 |
| Composition of coating agent | | | |
| Aqueous dispersion | S-1 | S-1 | S-1 |
| Additive | | | |
| Type | — | Silica | — |
| Added amount (parts by weight/resin) | — | 20 | — |
| Dried coating thickness (μm) | 2 | 2 | 2 |
| Conditions for heat treatment | 200° C. × 2 min | 200° C. × 2 min | 200° C. × 2 min |
| Corrosion resistance | ○ | ⊚ | X |
| Alkali resistance | X | X | ○ |
| Water resistance | Δ–○ | ○ | Δ–○ |
| Solvent resistance | Δ | ○ | Δ |
| Workability | ○ | ○ | ○ |
| Adhesion (I) | 100/100 | 100/100 | 100/100 |
| Adhesion (II) | ○ | ○ | ○ |

Comparative Example 12

A coated metal material was produced in substantially the same manner as in Example 32, except that the aqueous dispersion S-1 prepared in Comparative Example 7 falling outside the scope of the present invention was employed as the aqueous polyolefin dispersion and the coating agent was prepared by adding silica (AEROJIL 380 available from Nippon Aerojil K. K.) having particle diameters of about 0.007 μm to the aqueous dispersion S-1 in an amount of 20 parts by weight based on 100 parts by weight of the resin in the aqueous dispersion and stirring the resulting mixture.

The properties of the coated metal material thus obtained and the like are shown in Table 9.

Comparative Example 13

A coated metal material was produced in substantially the same manner as in Example 32, except that the aqueous dispersion H-3 prepared in Comparative Example 3 and containing the emulsifying agent was employed as the aqueous polyolefin dispersion.

The properties of the coated metal material thus obtained and the like are shown in Table 9.

In Comparative Example 11, the alkali resistance was inferior and the water resistance was also slightly interior, because the aqueous polyolefin resin dispersion according to the present invention was not employed. In Comparative Example 12, the corrosion resistance was improved over Comparative Example 11 because of the addition of silica, but the alkali resistance was not improved. In Comparative Example 13, the corrosion resistance was inferior, because the emulsifying agent was present in the coating film.

Examples 45 and 46

The aqueous dispersion E-4 prepared in Example 4 was employed as a coating agent. As metal materials, a 0.8-mm thick degreased copper plate was employed in Example 45, and a 0.8-mm thick aluminum plate was employed in Example 46. Then, the aqueous dispersion E-4 was applied on the metal materials by means of a Myer bar, and dried at 200° C. for two minutes. Thus, coated metal materials were produced. The dried coating thickness was 2 μm.

The properties of the coated metal materials thus obtained and the like are shown in Table 10.

TABLE 10

| | Example | | Comparative Example | |
|---|---|---|---|---|
| | 45 | 46 | 14 | 15 |
| Coating agent | E-4 | E-4 | S-1 | S-1 |
| Dried coating thickness (μm) | 2 | 2 | 2 | 2 |
| Metal plate | Copper | Aluminum | Copper | Aluminum |
| Conditions for heat treatment | 200° C. × 2 min | 200° C. × 2 min | 200° C. × 2 min | 200° C. × 2 min |
| Properties of coated metal plate | | | | |
| Corrosion resistance | ⊚ | ⊚ | ⊚ | ⊚ |
| Alkali resistance | ○ | ○ | X | X |
| Adhesion (I) | 100/100 | 100/100 | 100/100 | 100/100 |
| Adhesion (II) | ○ | ○ | ○ | ○ |

In Examples 45 and 46, the coated metal materials were excellent in corrosion resistance, alkali resistance and adhesion, because the aqueous polyolefin resin dispersion according to the present invention was employed.

Comparative Examples 14 and 15

Coated metal materials were produced in substantially the same manner as in Examples 45 and 46, except that the aqueous dispersion S-1 prepared in Comparative Example 7 was employed as the coating agent.

The properties of the coated metal materials thus obtained and the like are shown in Table 10.

In Comparative Examples 14 and 15, the alkali resistance was inferior, because the aqueous polyolefin resin dispersion falling outside the scope of the present invention was employed.

What is claimed is:

1. An aqueous polyolefin resin dispersion comprising a polyolefin resin, a basic compound and an aqueous medium, wherein the polyolefin resin comprises a copolymer of an unsaturated carboxylic acid or an anhydride thereof, an ethylenic hydrocarbon and a specific compound, wherein the specific compound is at least one of compounds represented by the following formulae (I) to (IV):

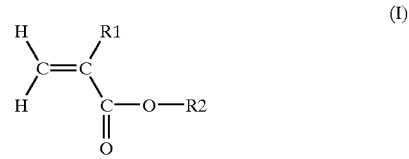

-continued

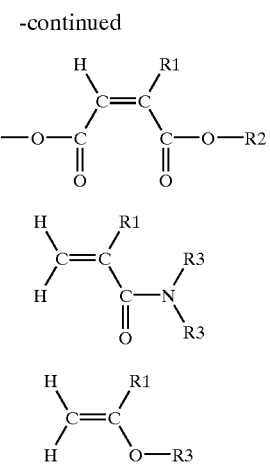

wherein R1 is a hydrogen atom or a methyl group, R2 is an alkyl group having a carbon number of not greater than 10, and R3 is a hydrogen atom or an alkyl group having a carbon number of not greater than 10, the proportion of the unsaturated carboxylic acid or the anhydride thereof in the copolymer is not smaller than 0.01 wt % and smaller than 5 wt % on a weight basis, wherein the weight ratio of the ethylenic hydrocarbon and the specific compound in the copolymer is (ethylenic hydrocarbon)/(specific compound)=55/45 to 99/1 (wt %), the aqueous polyolefin resin dispersion comprises virtually no nonvolatile water-compatibilizing agent, and the polyolefin resin is dispersed in the aqueous medium as having a number average particle diameter of not greater than 1 µm.

2. An aqueous polyolefin resin dispersion as set forth in claim 1, wherein the aqueous medium contains an organic solvent in an amount of not greater than 40 wt %.

3. An aqueous polyolefin resin dispersion as set forth in claim 2, wherein the organic solvent has a boiling point in the range of 30 to 250° C.

4. An aqueous polyolefin resin dispersion as set forth in claim 2, wherein the organic solvent has, in a molecule thereof, at least an atom having a Pauling electronegativity of not smaller than 3.0.

5. An aqueous polyolefin resin dispersion as set forth in claim 1, wherein the proportion of the basic compound is 0.5 to 3.0 mole equivalents based on the mole of carboxyl groups in the polyolefin resin.

6. An aqueous polyolefin resin dispersion as set forth in claim 1, wherein the basic compound is an organic amine compound having a boiling point of 30 to 250° C.

7. An aqueous polyolefin resin dispersion as set forth in claim 1, further comprising metal ions.

8. An aqueous polyolefin resin dispersion as set forth in claim 1, further comprising inorganic particles having an average particle diameter of 0.003 to 10 µm.

9. An aqueous polyolefin resin dispersion as set forth in claim 1, further comprising 0.01 to 100 parts by weight of a cross-linking agent based on 100 parts by weight of the polyolefin resin.

10. An aqueous polyolefin resin dispersion as set forth in claim 1, further comprising at least one of silica, layered inorganic compounds and phosphate compounds.

11. An aqueous polyolefin resin dispersion as set forth in claim 1, wherein the polyolefin resin has a melt flow rate of 0.01 to 500 g/10 minutes at 190° C. under a load of 2160 g.

12. An aqueous polyolefin resin dispersion as set forth in claim 1, wherein the polyolefin resin has a melt flow rate of 0.1 to 250 g/10 minutes at 190° C. under a load of 2160 g.

13. An aqueous polyolefin resin dispersion as set forth in claim 1, wherein the unsaturated carboxylic acid or the anhydride thereof as a constituent of the polyolefin resin is at least one selected from maleic anhydride, acrylic acid and methacrylic acid.

14. An aqueous polyolefin resin dispersion as set forth in claim 1, wherein the copolymer of the unsaturated carboxylic acid or the anhydride thereof, the ethylenic hydrocarbon and the specific compound as the polyolefin resin is an ethylene-acrylate-maleic anhydride terpolymer or an ethylene-methacrylate-maleic anhydride terpolymer.

15. An aqueous polyolefin resin dispersion as set forth in claim 1, which is formulated as a coating agent, an anti-corrosive coating agent or an adhesive.

16. An aqueous polyolefin resin dispersion as set forth in claim 15, wherein the lowest film formable temperature at which a coating film is formed by employing the coating agent or the anti-corrosive coating agent is not higher than 25° C.

17. An aqueous polyolefin resin dispersion as set forth in claim 1, further comprising an additional aqueous resin dispersion other than the aqueous polyolefin resin dispersion.

18. A coated film comprising a thermoplastic resin film and a polyolefin resin layer formed as having a thickness of 0.01 to 10 µm by applying an aqueous polyolefin resin dispersion as recited in claim 1 on at least one surface of the thermoplastic resin film.

19. A coated film as set forth in claim 18, wherein the polyolefin resin layer contains virtually no nonvolatile water-compatibilizing agent.

20. A coated film as set forth in claim 18, wherein the thermoplastic resin film is composed of polyethylene terephthalate, nylon 6 or polypropylene.

21. A coated metal material comprising a metal material, and a polyolefin resin layer formed as having a thickness of 0.01 to 10 µm by applying an aqueous polyolefin resin dispersion as recited in claim 1 on at least one surface of the metal material.

22. A coated metal material as set forth in claim 21, wherein the polyolefin resin layer contains virtually no compound serving as a nonvolatile water-compatibilizing agent.

23. A coated metal material as set forth in claim 4, wherein the metal material is a zinc-plated steel material, a copper material or an aluminum material.

24. A method for preparing an aqueous polyolefin resin dispersion, the method comprising the step of:

heating a polyolefin resin, a basic compound and an aqueous medium containing an organic solvent in a sealed vessel at a temperature of 80 to 200° C. with stirring so that the polyolefin resin is dispersed in the aqueous medium as having a number average particle diameter of not greater than 1 µm, wherein the polyolefin resin comprises a copolymer of an unsaturated carboxylic acid or an anhydride thereof, an ethylenic hydrocarbon and a specific compound, wherein the specific compound is at least one of compounds represented by the following formulae (I) to (IV):

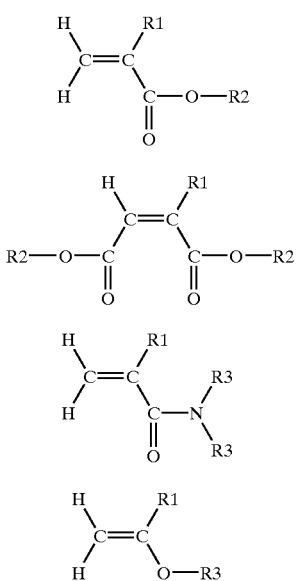

wherein R1 is a hydrogen atom or a methyl group, R2 is an alkyl group having a carbon number of not greater than 10, and R3 is a hydrogen atom or an alkyl group having a carbon number of not greater than 10, and the aqueous polyolefin resin dispersion comprises virtually no nonvolatile water-compatibilizing agent.

25. A production method for a coated film, comprising the steps of: applying an aqueous polyolefin resin dispersion as recited in claim 1 on at least one surface of a thermoplastic resin film; and drying the aqueous dispersion.

26. A production method for a coated film as set forth in claim 25, further comprising the step of subjecting the thermoplastic resin film to a stretching process after the aqueous polyolefin resin dispersion is applied on the at least one surface of the thermoplastic resin film and dried.

27. A production method for a coated metal material, comprising the steps of: applying an aqueous polyolefin resin dispersion as recited in claim 1 on a metal material; and drying the aqueous dispersion at 30 to 250° C. for formation of a coating film.

* * * * *